United States Patent
Chen et al.

(10) Patent No.: US 12,160,582 B2
(45) Date of Patent: Dec. 3, 2024

(54) PRECISION REFINEMENT FOR MOTION COMPENSATION WITH OPTICAL FLOW

(71) Applicant: INTERDIGITAL VC HOLDINGS, INC., Wilmington, DE (US)

(72) Inventors: Wei Chen, San Diego, CA (US); Yuwen He, San Diego, CA (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 150 days.

(21) Appl. No.: 17/619,192

(22) PCT Filed: Jun. 18, 2020

(86) PCT No.: PCT/US2020/038476
§ 371 (c)(1),
(2) Date: Dec. 14, 2021

(87) PCT Pub. No.: WO2020/257484
PCT Pub. Date: Dec. 24, 2020

(65) Prior Publication Data
US 2022/0286688 A1  Sep. 8, 2022

Related U.S. Application Data

(60) Provisional application No. 62/864,825, filed on Jun. 21, 2019.

(51) Int. Cl.
*H04N 19/137* (2014.01)
*H04N 19/132* (2014.01)
(Continued)

(52) U.S. Cl.
CPC ......... *H04N 19/137* (2014.11); *H04N 19/132* (2014.11); *H04N 19/176* (2014.11); *H04N 19/33* (2014.11)

(58) Field of Classification Search
None
See application file for complete search history.

(56) References Cited

U.S. PATENT DOCUMENTS 9,237,355 B2  1/2016  Chien
9,237,356 B2  1/2016  Wang
(Continued)

FOREIGN PATENT DOCUMENTS

CA  3065492 A1  11/2018
CN  107079165 A  8/2017
(Continued)

OTHER PUBLICATIONS

Luo et al., "CE2-related: Prediction refinement with optical flow for affine mode," Joint Video Experts Team (JVET) of ITU-T SG 16 WP 3 and ISO/IEC JTC 1/SC 29/WG 11, 14th Meeting: Geneva, Switzerland, Mar. 19-27, 2019, Document: JVET-N0236-r5. (Year: 2019).*
(Continued)

*Primary Examiner* — Reza Aghevli
(74) *Attorney, Agent, or Firm* — Klintworth & Rozenblat IP LLP

(57) ABSTRACT

Systems and methods are described for refining motion compensated predictions in block-based video coding. In an example embodiment, motion-compensated prediction is used to generate predicted sample values in a current block of samples. A precision difference value and a motion vector refinement for the current block are signaled in the bitstream. For each sample in the current block, a spatial gradient is calculated at the sample, and a scalar product is calculated between the spatial gradient and the motion vector refinement. The scalar product is scaled (e.g. bit-shifted) by an amount indicated by the precision difference value to generate a sample difference value, and the sample
(Continued)

difference value is added to the predicted sample value to generate a refined sample value.

17 Claims, 12 Drawing Sheets

(51) Int. Cl.
  *H04N 19/176* (2014.01)
  *H04N 19/33* (2014.01)

(56) References Cited

U.S. PATENT DOCUMENTS

| | | | |
|---|---|---|---|
| 10,368,090 B2 * | 7/2019 | Park | H04N 19/176 |
| 10,425,656 B2 * | 9/2019 | Wang | H04N 19/59 |
| 10,750,167 B2 * | 8/2020 | Son | H04N 19/593 |
| 10,812,803 B2 * | 10/2020 | Lee | H04N 19/61 |
| 11,356,697 B2 * | 6/2022 | Zhang | H04N 19/105 |
| 11,368,711 B2 * | 6/2022 | Zhang | H04N 19/577 |
| 11,570,462 B2 * | 1/2023 | Zhang | H04N 19/137 |
| 11,695,950 B2 | 7/2023 | Luo | |
| 2008/0117985 A1 | 5/2008 | Chen | |
| 2011/0255598 A1 | 10/2011 | Lin | |
| 2013/0272372 A1 | 10/2013 | Hannuksela | |
| 2013/0322526 A1 | 12/2013 | Aoki | |
| 2014/0341297 A1 | 11/2014 | Chien | |
| 2015/0131739 A1 | 5/2015 | Lee | |
| 2015/0195562 A1 | 7/2015 | Li | |
| 2016/0373742 A1 * | 12/2016 | Zhao | H04N 19/136 |
| 2016/0373743 A1 * | 12/2016 | Zhao | H04N 19/174 |
| 2017/0006308 A1 * | 1/2017 | Kwon | H04N 19/593 |
| 2017/0070748 A1 * | 3/2017 | Li | H04N 19/115 |
| 2017/0078701 A1 * | 3/2017 | Chen | H04N 19/184 |
| 2017/0134749 A1 * | 5/2017 | Park | H04N 19/176 |
| 2017/0214932 A1 | 7/2017 | Huang | |
| 2017/0310958 A1 | 10/2017 | Huang | |
| 2018/0077419 A1 * | 3/2018 | Minoo | H04N 19/33 |
| 2018/0098089 A1 | 4/2018 | Chen | |
| 2018/0220138 A1 * | 8/2018 | He | H04N 19/80 |
| 2018/0249176 A1 | 8/2018 | Lim | |
| 2018/0316929 A1 | 11/2018 | Li | |
| 2018/0343469 A1 * | 11/2018 | Jin | H04N 19/59 |
| 2018/0359483 A1 * | 12/2018 | Chen | H04N 19/44 |
| 2019/0028731 A1 | 1/2019 | Chuang | |
| 2019/0141318 A1 * | 5/2019 | Li | H04N 19/105 |
| 2019/0166375 A1 * | 5/2019 | Jun | H04N 19/105 |
| 2019/0174136 A1 * | 6/2019 | Jun | H04N 19/13 |
| 2019/0182481 A1 * | 6/2019 | Lee | H04N 19/51 |
| 2019/0182482 A1 * | 6/2019 | Vanam | H04N 19/132 |
| 2019/0191155 A1 * | 6/2019 | Ko | H04N 19/96 |
| 2019/0200040 A1 * | 6/2019 | Lim | H04N 19/51 |
| 2019/0215516 A1 * | 7/2019 | Lim | H04N 19/122 |
| 2019/0222837 A1 * | 7/2019 | Lee | H04N 19/44 |
| 2019/0273926 A1 * | 9/2019 | Heo | H04N 19/96 |
| 2019/0281285 A1 * | 9/2019 | Piao | H04N 19/96 |
| 2019/0297325 A1 * | 9/2019 | Lim | H04N 19/517 |
| 2019/0306513 A1 * | 10/2019 | Van der Auwera | H04N 19/11 |
| 2019/0306536 A1 * | 10/2019 | Lim | H04N 19/159 |
| 2019/0335179 A1 * | 10/2019 | Sjöberg | H04N 19/46 |
| 2020/0007895 A1 * | 1/2020 | Van der Auwera | H04N 19/176 |
| 2020/0021817 A1 * | 1/2020 | Van der Auwera | H04N 19/593 |
| 2020/0036966 A1 * | 1/2020 | Na | H04N 19/176 |
| 2020/0154127 A1 | 5/2020 | Lee | |
| 2020/0162728 A1 * | 5/2020 | Van der Auwera | H04N 19/423 |
| 2020/0162737 A1 * | 5/2020 | Van der Auwera | H04N 19/136 |
| 2020/0177877 A1 | 6/2020 | Chen | |
| 2020/0195961 A1 | 6/2020 | Toma | |
| 2020/0221122 A1 | 7/2020 | Ye | |
| 2020/0244956 A1 * | 7/2020 | Lee | H04N 19/109 |
| 2020/0275118 A1 * | 8/2020 | Wang | H04N 19/52 |
| 2020/0296405 A1 | 9/2020 | Huang | |
| 2020/0304832 A1 * | 9/2020 | Ramasubramonian | H04N 19/136 |
| 2021/0136404 A1 | 5/2021 | Chen | |
| 2021/0266531 A1 * | 8/2021 | Kang | H04N 19/107 |
| 2021/0392367 A1 * | 12/2021 | Zhang | H04N 19/577 |
| 2022/0286688 A1 * | 9/2022 | Chen | H04N 19/176 |

FOREIGN PATENT DOCUMENTS

| | | | | |
|---|---|---|---|---|
| CN | 107820080 A | 3/2018 | | |
| CN | 108432250 | 8/2018 | | |
| JP | 2020052964 A | 4/2020 | | |
| JP | 2020526964 A | 8/2020 | | |
| RU | 2530318 C2 | 10/2014 | | |
| RU | 2571410 C2 | 12/2015 | | |
| RU | 2580054 C2 | 4/2016 | | |
| RU | 2584501 C1 | 5/2016 | | |
| RU | 2654149 C1 | 5/2018 | | |
| TW | 201739252 | 11/2017 | | |
| WO | 2017156705 A1 | 9/2017 | | |
| WO | 2017157259 A1 | 9/2017 | | |
| WO | 2018064524 A1 | 4/2018 | | |
| WO | 2018065296 A1 | 4/2018 | | |
| WO | 2019010156 A1 | 1/2019 | | |
| WO | WO-2019009752 A1 * | 1/2019 | | G06F 17/18 |
| WO | WO-2019066472 A1 * | 4/2019 | | H04N 19/105 |
| WO | WO-2019240458 A1 * | 12/2019 | | H04N 19/105 |
| WO | WO-2020149770 A1 * | 7/2020 | | H04N 19/105 |
| WO | 2020191034 | 9/2020 | | |
| WO | WO-2020185619 A1 * | 9/2020 | | H04N 19/105 |
| WO | WO-2020185885 A1 * | 9/2020 | | G06V 10/62 |

OTHER PUBLICATIONS

ITU-T Recommendation H.264 and ISO/IEC/MPEG-4 part 10, "Advanced Video Coding for Generic Audiovisual Services", Series H: Audiovisual and Multimedia Systems, Infrastructure of audiovisual services—Coding of moving video, Nov. 2007, 564 pages.

SMPTE 421M, "VC-1 Compressed Video Bitstream Format and Decoding Process". SMPTE Standard, 2006, (493 pages).

Bross, et. al., "High Efficiency Video Coding (HEVC) Text Specification Draft 10 (for FDIS and Last Call)". Joint Collaborative Team on Video Coding (JCT-VC), Document No. JCTVC-L1003, Jan. 2013, 310 pages.

Chen, Jianle, et. al., "Coding Tools Investigation for Next Generation Video Coding". ITU-Telecommunication Standardization Sector, Study Group 16, Contribution 806, COM16-C806, Jan. 2015, pp. 1-7.

Alshina, E., et. al., "Known Tools Performance Investigation for Next Generation Video Coding". ITU—Telecommunications Standardization Sector, SG16/Q6, Video Coding Experts Group (VCEG), Jun. 2015, VCEG-AZ05, 7 pages.

Karczewicz, M., et. al., "Report of AHG1 On Coding Efficiency Improvements". ITU—Telecommunications Standardization Sector, Video Coding Experts Group (Vceg), SG16/Q6, VCEG-AZ01, Jun. 2015, 2 pages.

Ohm, Jens-Rainer., et. al., "Report of AHG on Future Video Coding Standardization Challenges". International Organization for Standardization, Coding of Moving Pictures and Audio, ISO/IEC JTC1/SC29/WG11 MPEG2014/M36782, Jun. 2015, 4 pages.

Segall, Andrew. et. al. "Joint Call For Proposals On Video Compression With Capability Beyond HEVC". Joint Video Exploration Team (JVET) of ITU-T SG 16 WP 3 and ISO/IEC JTC 1/SC 29/WG 11, JVET-H1002-v6, Oct. 18-24, 2017, 27 pages.

Bross, Benjamin, "Versatile Video Coding (Draft 1)". Joint Video Experts Team (JVET) of ITU-T SG 16 WP 3 and ISO/IEC JTC 1/SC 29/WG 11 , JVET-J1001-v2, Apr. 10-20, 2018, 40 pages.

Chen, Jianle, et. al., "Algorithm Description of Joint Exploration Test Model 7 (JEM7)". Joint Video Exploration Team (JVET) of ITU-T SG 16 WP 3 And ISO/IEC JTC 1/SC 29/WG 11, JVET-G1001-v1, Jul. 13-21, 2017, 48 pages.

International Telecommunication Union, "Affine Transform Prediction for Next Generation Video Coding". Huawei Technologies Co., Ltd., Telecommunication Standardization Sector, ITU-T SG16/Q6 Doc. COM16-C1016, Sep. 2015, pp. 1-11.

(56) References Cited

OTHER PUBLICATIONS

Chen, Jianle, et. al., "EE4: Enhanced Motion Vector Difference Coding". Joint Video Exploration Team (JVET) of ITU-T SG 16 WP 3 and ISO/IEC JTC 1/SC 29/WG 11, JVET-E0076, Jan. 12-20, 2017, pp. 1-4.

Wikipedia, "Sobel Filter". Wikipedia web article available at: https://en.wikipedia.org/w/index.php?title=Sobel_operator&oldid=837616168, updated on Apr. 21, 2018, 9 pages.

He, Yuwen, et. al., "CE4-Related: Adaptive Precision for Affine MVD Coding". Joint Video Exploration Team, JVET-0259, Power Point Presentation, Oct. 6, 2018, 8 pages.

Liu, Hongbin, et. a., "CE4-related: Adaptive Motion Vector Resolution for Affine Inter Mode". Joint Video Experts Team (JVET) of ITU-T SG 16 WP 3 and ISO/IEC JTC 1/SC 29/WG 11, JVET-L0332-v1, Oct. 3-12, 2018, 3 pages.

Liu, Hongbin, et. a., "CE4-related: Adaptive Motion Vector Resolution for Affine Inter Mode". Joint Video Experts Team (JVET) of ITU-T SG 16 WP 3 and ISO/IEC JTC 1/SC 29/WG 11, JVET-L0332-v1, Power Point Presentation, Oct. 3-12, 2018, 6 pages.

He, Yuwen, et. al., "CE4-Related: Affine Motion Estimation Improvements". InterDigital Communications, Inc., Joint Video Experts Team (JVET) of ITU-T SG 16 WP 3 and ISO/IEC JTC 1/SC 29/WG 11, JVET-L0260-r2, Oct. 3-12, 2018, 4 pages.

He, Yuwen, et. al., "CE4-Related: Affine Motion Estimation Improvements". InterDigital Communications, Inc., Joint Video Experts Team (JVET) of ITU-T SG 16 WP 3 and ISO/IEC JTC 1/SC 29/WG 11, JVET-L0260-r2, Power Point Presentation, Oct. 3-12, 2018, 4 pages.

He, Yuwen, et. al., "CE4-Related: Adaptive Precision for Affine MVD Coding". Joint Video Exploration Team, JVET-L0259, Oct. 6, 2018, 4 pages.

Liu, Hongbin, et. al. "CE2-related: Joint Test of AMVR for Affine Inter Mode (Test 2.1.1 and Test 2.1.2)". Joint Video Experts Team (JVET) of ITU-T SG 16 WP 3 and ISO/IEC JTC 1/SC 29/WG 11, JVET-M0247, Jan. 9-18, 2019, 3 pages.

Luo, Jiancong, et al., "CE2: Adaptive precision for affine MVD coding (Test 2.1.1)". Joint Video Experts Team (JVET) of ITU-T SG 16 WP 3 and ISO/IEC JTC 1/SC 29/WG 11, JVET-M0420, Jan. 9-18, 2019, 3 pages.

International Search Report and Written Opinion of the International Searching Authority for PCT/US2019/048615 mailed Nov. 20, 2019, 13 pages.

Chen, Y-W, et. al. "Description of SDR, HDR, and 360°Video Coding Technology Proposal by Qualcomm And Technicolor: Low and High Complexity Versions". Joint Video Exploration Team, JVET-J0021, JVET Meeting, Apr. 10-20, 2018 (43 pages).

Luo, Jiancong, et al., "CE2: Adaptive Precision for Affine MVD Coding (Test 2.1.1)". Joint Video Exploration Team, JVET-M0420, Jan. 3, 2019 (3 pages).

International Preliminary Report on Patentability for PCT/US2019/048615 issued on Mar. 2, 2021, 9 pages.

Luo, Jiancong, et. al., "CE2-Related: Prediction Refinement With Optical Flow For Affine Mode". Joint Video Exploration Team (JVET) ISO/IEC JTC1/SC29/WG11 and ITU-T SG.16, JVET-N0236, Mar. 14, 2019 ( 7 pages).

Bross, Benjamin, et. al., "Versatile Video Coding (Draft 4)". Joint Video Exploration Team (JVET) ISO/IEC JTC1/SC29/WG11 and ITU-T SG.16, JVET-M1001, Mar. 9, 2019.

Chen, J., et. al., "Enhanced Motion Vector Difference Coding". Joint Video Exploration Team (JVET) ISO/IEC JTC1/SC29/WG11 and ITU-T SG.16, JVET-D0123-v3, Oct. 16, 2016 (3 pages).

Bross, Benjamin, et. al., "Versatile Video Coding (Draft 2)". Joint Video Experts Team (JVET) of ITU-T SG 16 WP 3 and ISO/IEC JTC 1/SC 29/WG 11, JVET-K1001-v6, Jul. 2018, 140 pages.

Chen, Jianle, et. al., "Algorithm Description for Versatile Video Coding and Test Model 5 (VTM 5)". Joint Video Experts Team (JVET) of ITU-T SG 16 WP 3 and ISO/IEC JTC 1/SC 29/WG 11, JVET-N1002-v2, Mar. 19-27, 2019, 76 pages.

International Search Report and Written Opinion of the international Searching Authority for PCT/US2020/038476 mailed Aug. 11, 2020, 10 pages.

Luo, Jiancong, et. al., "CE2-related: Prediction Refinement With Optical Flow For Affine Mode". Joint Video Experts Team (JVET) of ITU-T SG 16 WP 3 and ISO/IEC JTC 1/SC 29/WG 11, JVET-N0236-r5, Mar. 19-27, 2019, 7 pages.

Luo, Jiancong, et. al., "CE2-related: Prediction Refinement With Optical Flow For Affine Mode". Joint Video Experts Team (JVET) of ITU-T SG 16 WP 3 and ISO/IEC JTC 1/SC 29/WG 11, JVET-N0236-r5 Power Point Presentation, Mar. 19-27, 2019, 7 pages.

Chen, Jianle, et. al., "Algorithm Description of Joint Exploration Test Model 6 (JEM6)". Joint Video Exploration Team (JVET) of ITU-T SG 16 WP 3 And ISO/IEC JTC 1/SC 29/WG 11, JVET-F1001-v3, Mar. 31-Apr. 7, 2017 (51 pages).

International Preliminary Report on Patentability for PCT/US2020/038476 issued Dec. 21, 2021, 7 pages.

Ghaznavi-Youvalari, Ramin, et al. "CE2: Merge Mode with Regression-based Motion Vector Field (Test 2.3.3)". Nokia, Joint Video Experts Team (JVET)of ITU-T SG 16 WP 3 and ISO/IEC JTC 1/SC 29/WG 11, JVET-M0302, Jan. 9-18, 2019 (5 pages).

Chen, J., et al. "Algorithm description for Versatile Video Coding and Test Model 3 (VTM 3)". Joint Video Experts Team (JVET) of ITU-T SG 16 WP 3 and ISO/IEC JTC 1/SC 29/WG 11 N18028, Macao, CN, Oct. 2018 (48 pages).

Xiu, X. , et al., "CE9-Related: Complexity Reduction and Bit-Width Control for Bi-Directional Optical Flow (BIO)". Joint Video Experts Team (JVET) of ITU-T SG 16 WP 3 and ISO/IEC JTC 1/SC 29/WG 11, JVET-L0256-V2, Oct. 3-12, 2018 (15 pages).

Bross, B. et al., "Versatile Video Coding (Draft 2)". Joint Video Experts Team (JVET) of ITU-T SG 16 WP 3 and ISO/ IEC JTC 1/SC 29/WG 11, JVET-K1001-v1, Jul. 2018 (42 pages).

Bross et al., "High Efficiency Video Coding (HEVC) text specification draft 10 (For FDIS & Consent)", Joint Collaborative Team on Video Coding (JCT-VC) of ITU-T SG 16 WP 3 and ISO/IEC JTC 1/SC 29/WG 11, Document:. JCTVC-L1003_v1, 12th Meeting: Geneva, CH, Jan. 14-23, 2013 (321 pages).

"VTM-2.0.1 reference software", available at https://vcgit.hhi.fraunhofer.de/jvet/VVCSoftware_VTM/tags/VTM-2.0.1. retrieved Mar. 3, 2021 (1 page).

Luo, Jiancong et al., "Prediction Refinement with Optical Flow for Affine Motion Compensation", 2019 IEEE Visual Communications and Image Processing (VCIP), IEEE, Dec. 1, 2019 (4 pages).

"JEM-7.0 Reference Software", Available at <https://jvet.hhi.fraunhofer.de/svn/svn_HMJEMSoftware/tags/HM-16.6-JEM-7.0> retrieved Apr. 27, 2020 (1 page).

"HM Reference Software HM-16.9", available at <https://hevc.hhi.fraunhofer.de/svn/svn_HEVCSoftware> retrieved Dec. 14, 2021 (2 pages).

"BMS-2.0 Reference Software", available at <https://vcgit.hhi.fraunhofer.de/jvet/VVCSoftware_BMS/tags/BMS-2.1rc1> retrieved Mar. 18, 2021 (1 page).

Zhang, K. et al., "Non-CE2: Interweaved Prediction for Affine Motion Compensation", Document JVET-M0268, Joint Video Experts Team (JVET) of ITU-T SG 16 WP 3 and ISO/IEC JTC 1/SC 29/WG 11, Document: JVET-M0268, 13th Meeting: Marrakech, MA, Jan. 9-18, 2019 (4 pages).

Huang, H. et al., "CE2-related: Simplified prediction refinement for affine motion compensation", Document JVET-N0504, Joint Video Experts Team (JVET)of ITU-T SG 16 WP 3 and ISO/IEC JTC 1/SC 29/WG 11, 14th Meeting: Geneva, CH, Mar. 19-27, 2019 (3 pages).

Wang Hendry, Y. et al., "AHG12: Signalling for tile and brick partitioning", Document JVET-N0857-v1, Joint Video Experts Team (JVET) of ITU-T SG 16 WP 3 and ISO/IEC JTC 1/SC 29/WG 11, Document: JVET-N0857-v1, 14th Meeting: Geneva, CH, Mar. 19-27, 2019 (4 pages).

Interdigital Communications, Inc., et al., "FS_QoE_VR: MPEG Immersive Media Metrics", 3GPP Tdoc S4-190323, 3GPP TSG-SA4 Meeting #103, Newport Beach, USA, Apr. 8-12, 2019 (6 pages).

International Preliminary Report on Patentability for PCT Application No. PCT/US2020/016564 issued Aug. 10, 2021 (9 pages).

(56) References Cited

OTHER PUBLICATIONS

Notification of Transmittal of the International Search Report and the Written Opinion of the International Searching Authority, or the Declaration for PCT Application No. PCT/US2020/016564 mailed Apr. 29, 2020 (15 pages).
Li et al., "An Efficient Four-Parameter Affine Motion Model for Video Coding", IEEE Transactions On Circuits and Systems for Video Technology, vol. 28, No. 8., Aug. 2018, pp. 1934-1948 (15 pages).
Suhring, K. et al., "H.264/14496-10 Avc Reference Software Manual (Revised for JM 19.0)", Document JVT-AE010 revised, Joint Video Team (JVT) of ISO/IEC MPEG & ITU-T VCEG (ISO/IEC JTC1/SC29/WG11 and ITU-T SG16 Q.6), 31st Meeting, London, UK, Jun 28-Jul. 3, 2009 (98 pages).

\* cited by examiner

PRECISION REFINEMENT FOR MOTION COMPENSATION WITH OPTICAL FLOW

CROSS-REFERENCE TO RELATED APPLICATION

The present application is a national stage application under 35 U.S.C. § 371 of International Application No. PCT/US2020/038476, entitled "PRECISION REFINEMENT FOR MOTION COMPENSATION WITH OPTICAL FLOW," filed on Jun. 18, 2020, which claims benefit under 35 U.S.C. § 119(e) from U.S. Provisional Patent Application Ser. No. 62/864,825, entitled "Precision Refinement for Motion Compensation with Optical Flow," filed Jun. 21, 2019, which is hereby incorporated by reference in its entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG-1/2/4 part 2, H.264/MPEG-4 part 10 AVC, VC-1, and High Efficiency Video Coding (HEVC), which was developed by JCT-VC (Joint Collaborative Team on Video Coding) of ITU-T/SG16/Q.6/VCEG and ISO/IEC/MPEG.

In October 2017, a joint call for proposals (CfP) on video compression with capability beyond HEVC was issued by ITU-T and ISO/IEC. In April 2018, 22 CfP responses for standard dynamic range category were received and evaluated at the 10-th JVET meeting, demonstrating a compression efficiency gain over HEVC around 40%. Based on such evaluation results, the Joint Video Expert Team (JVET) launched a new project to develop the new generation video coding standard named Versatile Video Coding (WC). In the same month, a reference software codebase, called VVC test model (VTM), was established for demonstrating a reference implementation of the WC standard. For the initial VTM-1.0, most coding modules, including intra prediction, inter prediction, transform/inverse transform and quantization/de-quantization, and in-loop filters followed the existing HEVC design, with an exception that a multi-type tree based block partitioning structure is used in the VTM. Meanwhile, to facilitate the assessment of new coding tools, another reference software base called benchmark set (BMS) was also generated. In the BMS codebase, a list of coding tools inherited from the Joint Exploration Model (JEM), which provides higher coding efficiency and moderate implementation complexity, are included on top of the VTM and used as the benchmark when evaluating similar coding technologies during the VVC standardization process. Specifically, there are nine JEM coding tools integrated in the BMS-1.0, including 65 angular intra prediction directions, modified coefficient coding, advanced multiple transform (AMT)+4×4 non-separable secondary transform (NSST), affine motion model, generalized adaptive loop filter (GALF), advanced temporal motion vector prediction (ATMVP), adaptive motion vector precision, decoder-side motion vector refinement (DMVR) and linear model (LM) chroma mode.

SUMMARY

Embodiments described herein include methods that are used in video encoding and decoding (collectively "coding"). Systems and methods are described for refining motion compensated predictions in block-based video coding. A video coding method according to some embodiments includes: using motion-compensated prediction, generating an initial predicted sample value for at least a first sample position in a current block of samples; determining a motion vector refinement associated with at least the first sample position; determining, at the first sample position, a spatial gradient of sample values; determining a sample difference value by calculating a scalar product of the spatial gradient and the motion vector refinement; and adding the sample difference value to the initial predicted sample value to generate a refined sample value.

In some embodiments, the method is performed by a decoder, and determining a motion vector refinement includes decoding the motion vector refinement from a bitstream.

Some embodiments further include decoding refinement precision information from the bitstream, wherein determining the sample difference value comprises scaling the scalar product by an amount indicated by the precision information. The scaling of the scalar product may include bit-shifting the scalar product by an amount indicated by the precision information.

In some embodiments, the motion-compensated prediction is performed using at least one motion vector having an initial precision, and the refinement precision information includes a precision difference value representing a difference between the initial precision and the refinement precision.

In some embodiments, scaling the scalar product includes right-shifting the scalar product by a number of bits equal to the sum of the precision difference value and the initial precision.

In some embodiments, the method is performed by an encoder, the determining of a motion vector refinement includes selecting the motion vector refinement to substantially minimize a prediction error with respect to an input video block, and the method further includes encoding the motion vector refinement in a bitstream.

In some embodiments, the motion vector refinement is signaled in the bitstream as an index. In some embodiments, the index may identify one of a plurality of motion vector refinements from the group consisting of (0,1), (1,0), (0,1), and (−1,0). In some other embodiments, the index may identify one of a plurality of motion vector refinements from the group consisting of (0,1), (1,0), (0,1), (−1,0), (−1,1), (1,1), (1,1), and (−1,1).

In some embodiments, the motion vector refinement is associated with all sample positions in the current block (or in a current subblock). In some other embodiments, the motion vector refinement is determined on a sample-by-sample basis and may be different for different samples.

Some embodiments include at least one processor configured to perform any of the methods described herein. In some such embodiments, a computer-readable medium (e.g. a non-transitory medium) is provided that stores instructions operative to perform any of the methods described herein.

Some embodiments include a computer-readable medium (e.g. a non-transitory medium) storing a video encoded using one or more of the methods disclosed herein.

An encoder or decoder system may include a processor and a non-transitory computer-readable medium storing instructions for performing the methods described herein.

One or more of the present embodiments also provide a computer readable storage medium having stored thereon instructions for encoding or decoding video data according to any of the methods described above. The present embodiments also provide a computer readable storage medium (e.g. a non-transitory medium) having stored thereon a bitstream generated according to the methods described above. The present embodiments also provide a method and apparatus for transmitting the bitstream generated according to the methods described above. The present embodiments also provide a computer program product including instructions for performing any of the methods described.

EXAMPLE DEVICES AND NETWORKS FOR IMPLEMENTATION OF THE EMBODIMENTS

Figure 1A:
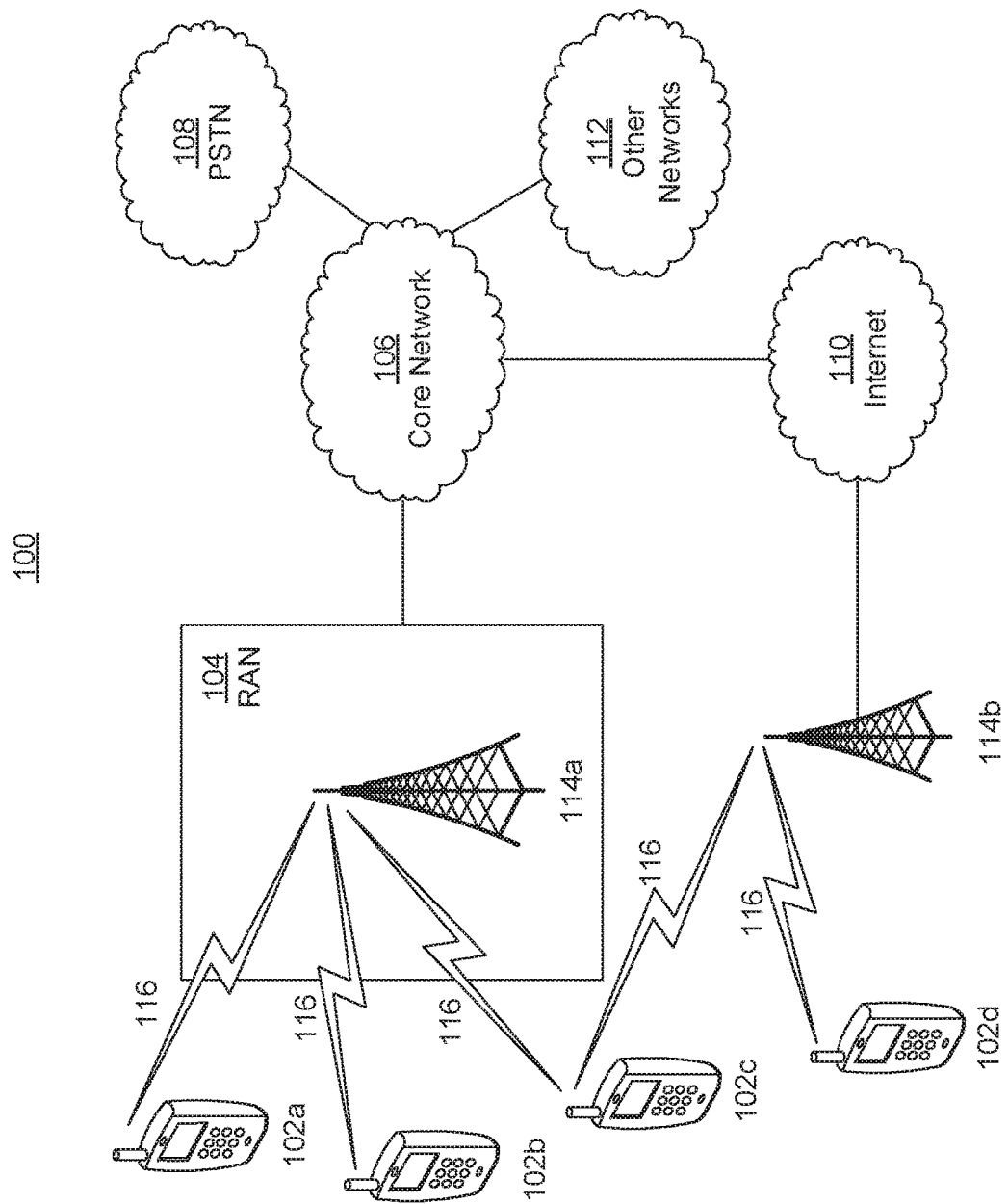
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
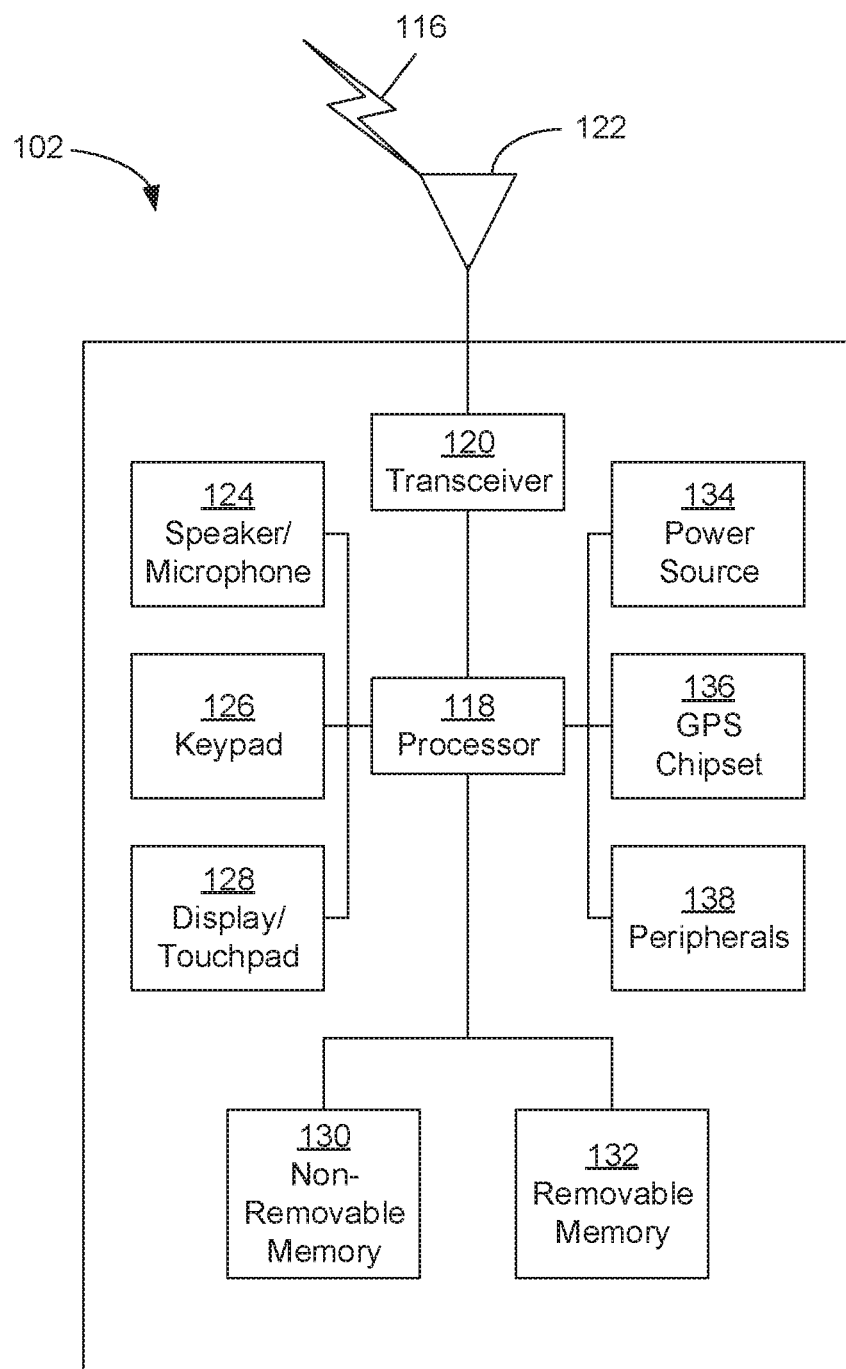
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example Systems.

Figure 1C:
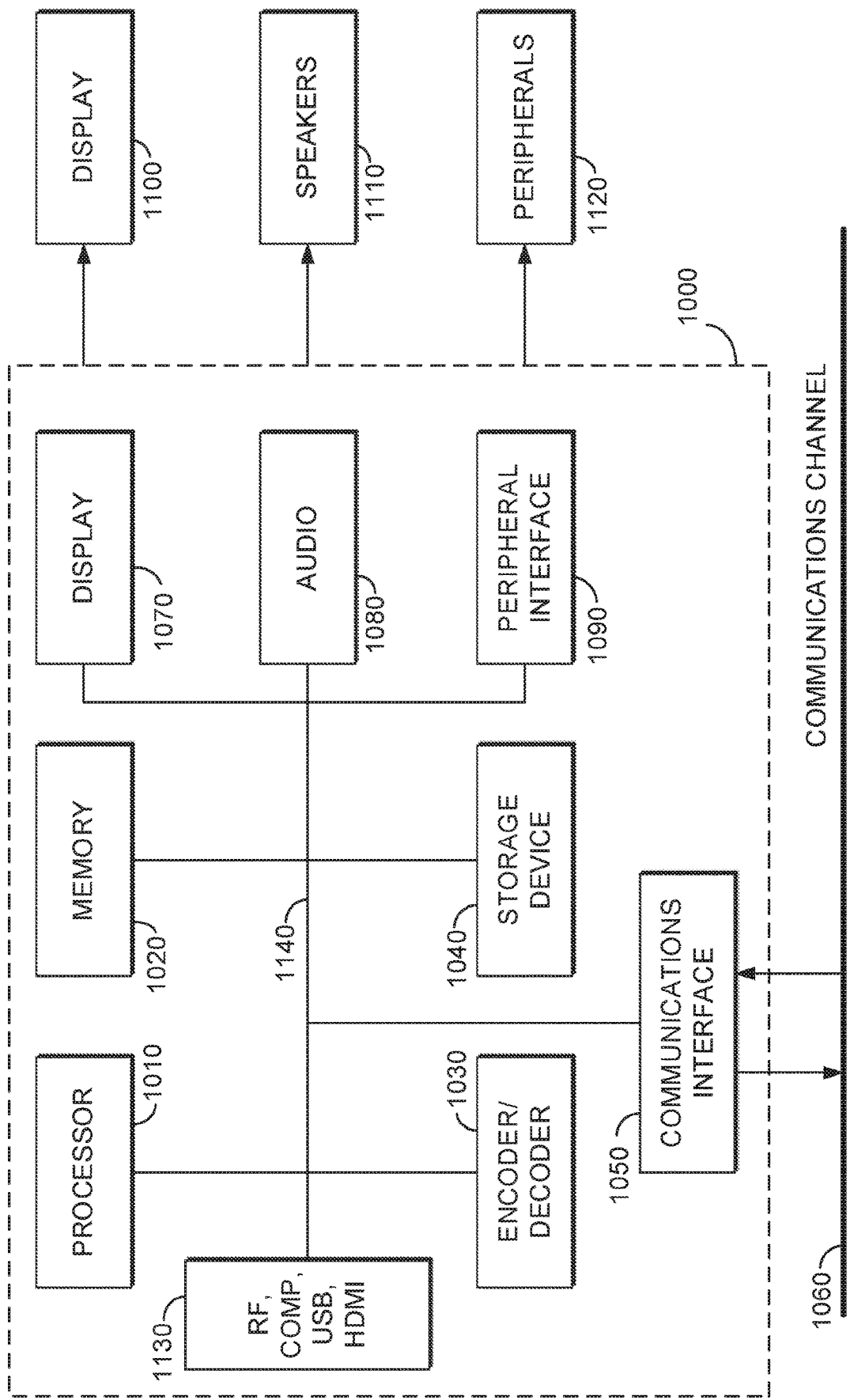
FIG. 1C is a functional block diagram of a system used in some embodiments described herein.

Some embodiments are implemented using systems such as the system of FIG. 1C. FIG. 1C is a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1C, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

DETAILED DESCRIPTION

Block-Based Video Coding.

Figure 2A:
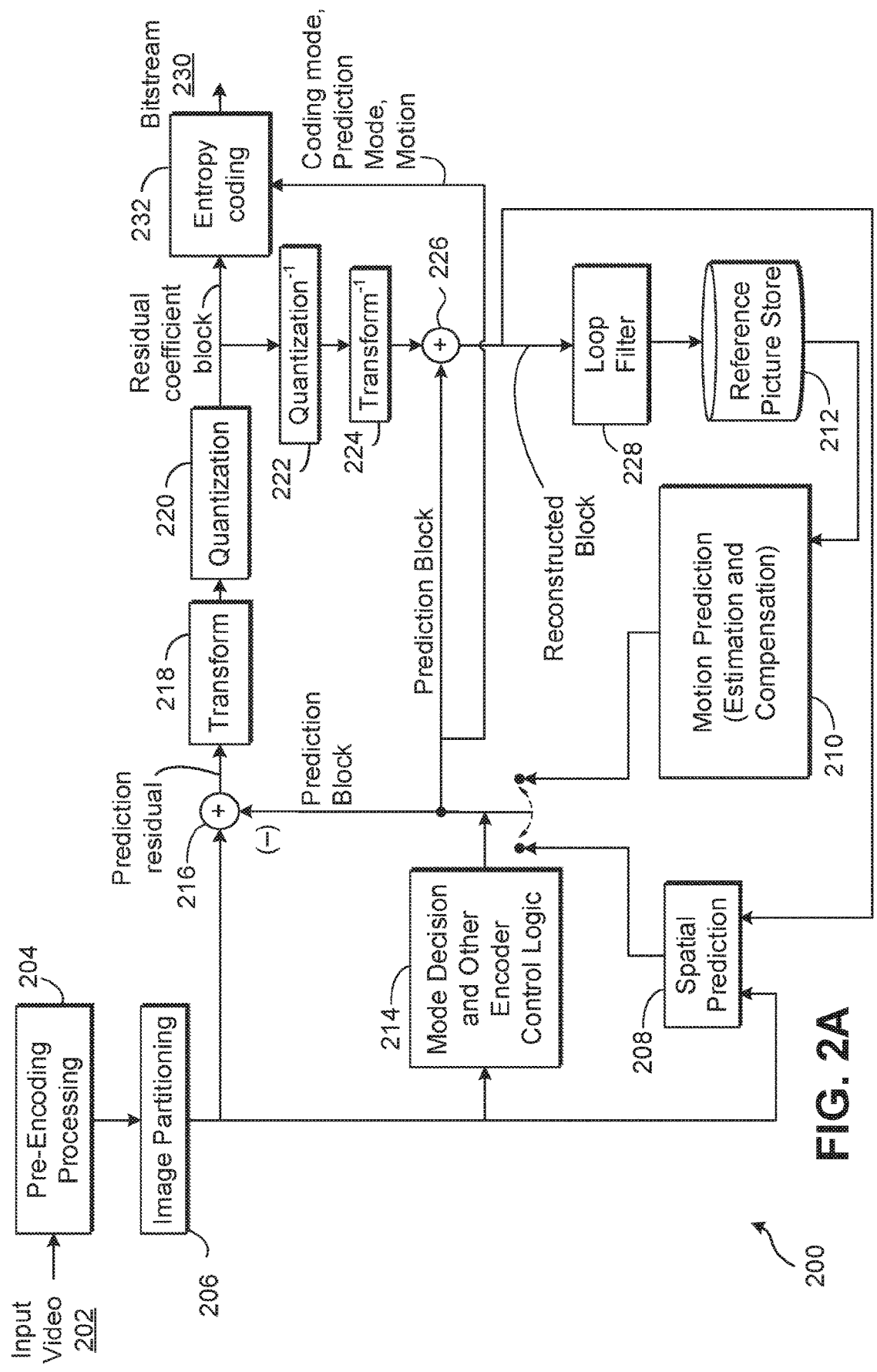
FIG. 2A is a functional block diagram of block-based video encoder, such as an encoder used for WC.

Like HEVC, VVC is built upon the block-based hybrid video coding framework. FIG. 2A gives the block diagram of a block-based hybrid video encoding system 200. Variations of this encoder 200 are contemplated, but the encoder 200 is described below for purposes of clarity without describing all expected variations.

Before being encoded, a video sequence may go through pre-encoding processing (204), for example, applying a color transform to an input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

The input video signal 202 including a picture to be encoded is partitioned (206) and processed block by block. Some blocks may be referred to as coding units (CUs). Different CUs may have different sizes. In VTM-1.0, a CU can be up to 128×128 pixels. However, different from the HEVC which partitions blocks only based on quad-trees, in the VTM-1.0, a coding tree unit (CTU) is split into CUs to adapt to varying local characteristics based on quad/binary/ternary-tree. Additionally, the concept of multiple partition unit type in the HEVC is removed, such that the separation of CU, prediction unit (PU) and transform unit (TU) does not exist in the VVC-1.0 anymore; instead, each CU is always used as the basic unit for both prediction and transform without further partitions. In the multi-type tree structure, a CTU is firstly partitioned by a quad-tree structure. Then, each quad-tree leaf node can be further partitioned by a binary and ternary tree structure. There are five splitting types: quaternary partitioning, vertical binary partitioning, horizontal binary partitioning, vertical ternary partitioning, and horizontal ternary partitioning.

In the encoder of FIG. 2A, spatial prediction (208) and/or temporal prediction (210) may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. A temporal prediction signal for a given CU may be signaled by one or more motion vectors (MVs) which indicate the amount and the direction of motion between the current CU and its temporal reference. Also, if multiple reference pictures are supported, a reference picture index may additionally be sent, which is used to identify from which reference picture in the reference picture store (212) the temporal prediction signal comes.

The mode decision block (214) in the encoder chooses the best prediction mode, for example based on a rate-distortion optimization method. This selection may be made after spatial and/or temporal prediction is performed. The intra/inter decision may be indicated by, for example, a prediction mode flag. The prediction block is subtracted from the current video block (216) to generate a prediction residual. The prediction residual is de-correlated using transform (218) and quantized (220). (For some blocks, the encoder may bypass both transform and quantization, in which case the residual may be coded directly without the application of the transform or quantization processes.) The quantized residual coefficients are inverse quantized (222) and inverse transformed (224) to form the reconstructed residual, which is then added back to the prediction block (226) to form the reconstructed signal of the CU. Further in-loop filtering, such as deblocking/SAO (Sample Adaptive Offset) filtering, may be applied (228) on the reconstructed CU to reduce encoding artifacts before it is put in the reference picture store (212) and used to code future video blocks. To form the output video bit-stream 230, coding mode (inter or intra), prediction mode information, motion information, and quantized residual coefficients are all sent to the entropy coding unit (108) to be further compressed and packed to form the bit-stream.

Figure 2B:
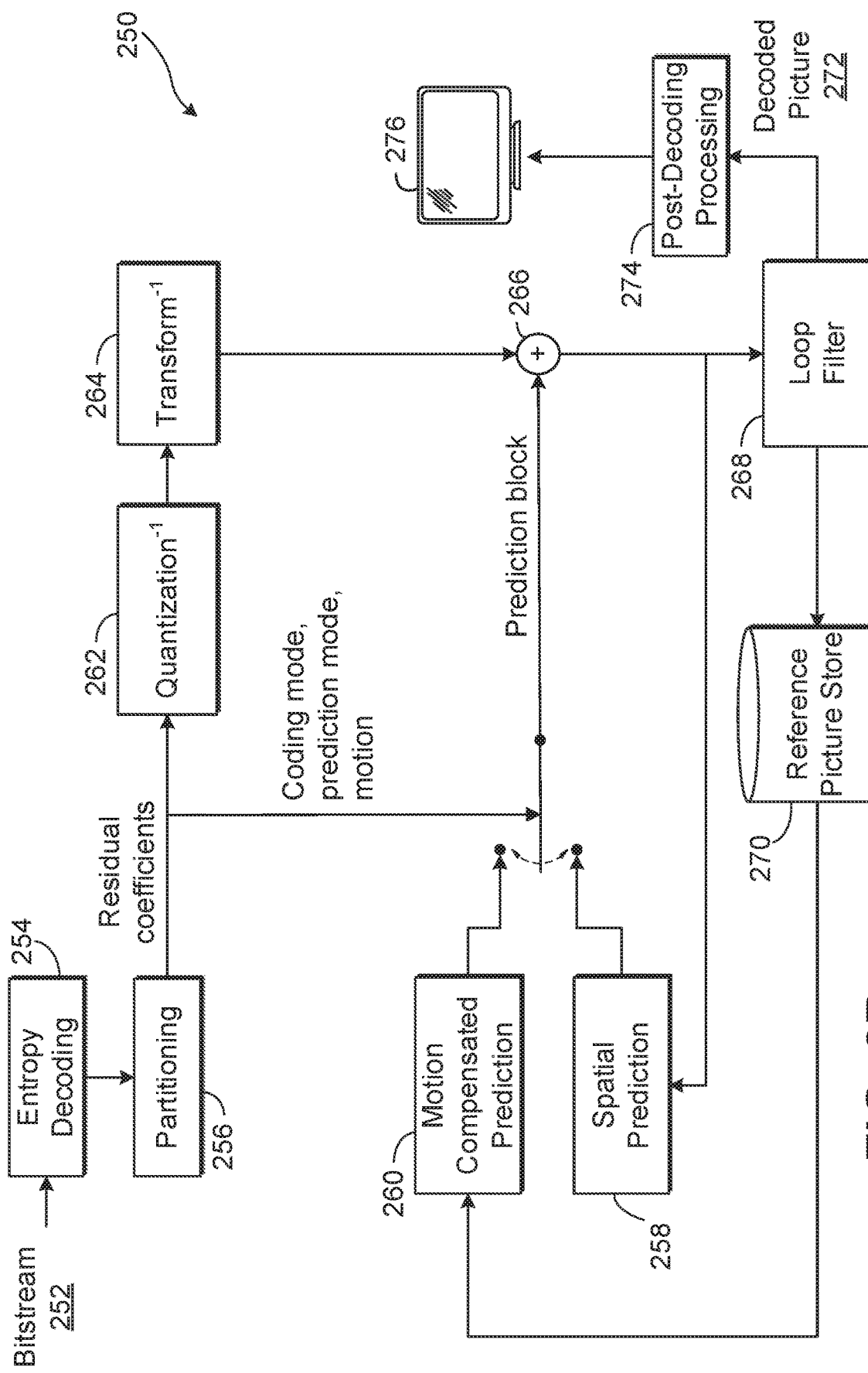
FIG. 2B is a functional block diagram of a block-based video decoder, such as a decoder used for VVC.

FIG. 2B gives a block diagram of a block-based video decoder 250. In the decoder 250, a bitstream is decoded by the decoder elements as described below. Video decoder 250 generally performs a decoding pass reciprocal to the encoding pass as described in FIG. 2A. The encoder 200 also generally performs video decoding as part of encoding video data.

In particular, the input of the decoder includes a video bitstream 252, which can be generated by video encoder 200. The video bit-stream 252 is first unpacked and entropy decoded at entropy decoding unit 254 to obtain transform coefficients, motion vectors, and other coded information. Picture partition information indicates how the picture is partitioned. The decoder may therefore divide (256) the picture according to the decoded picture partitioning information. The coding mode and prediction information are sent to either the spatial prediction unit 258 (if intra coded) or the temporal prediction unit 260 (if inter coded) to form the prediction block. The residual transform coefficients are sent to inverse quantization unit 262 and inverse transform unit 264 to reconstruct the residual block. The prediction block and the residual block are then added together at 266 to generate the reconstructed block. The reconstructed block may further go through in-loop filtering 268 before it is stored in reference picture store 270 for use in predicting future video blocks.

The decoded picture 272 may further go through post-decoding processing (274), for example, an inverse color transform (e.g. conversion from YCbCr 4:2:0 to RGB 4:4:4) or an inverse remapping performing the inverse of the remapping process performed in the pre-encoding processing (204). The post-decoding processing can use metadata derived in the pre-encoding processing and signaled in the bitstream. The decoded, processed video may be sent to a display device 276. The display device 276 may be a separate device from the decoder 250, or the decoder 250 and the display device 276 may be components of the same device.

Various methods and other aspects described in this disclosure can be used to modify modules of a video encoder 200 or decoder 250. Moreover, the systems and methods disclosed herein are not limited to VVC or HEVC, and can be applied, for example, to other standards and recommendations, whether pre-existing or future-developed, and extensions of any such standards and recommendations (including WC and HEVC). Unless indicated otherwise, or technically precluded, the aspects described in this disclosure can be used individually or in combination.

Inter Prediction.

Figure 3A:
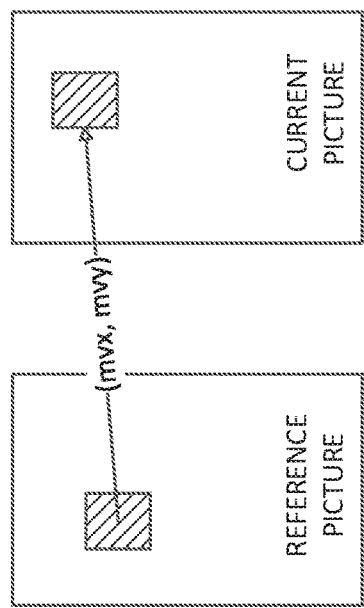
FIGS. 3A-3B illustrate motion compensated prediction.
Figure 3B:
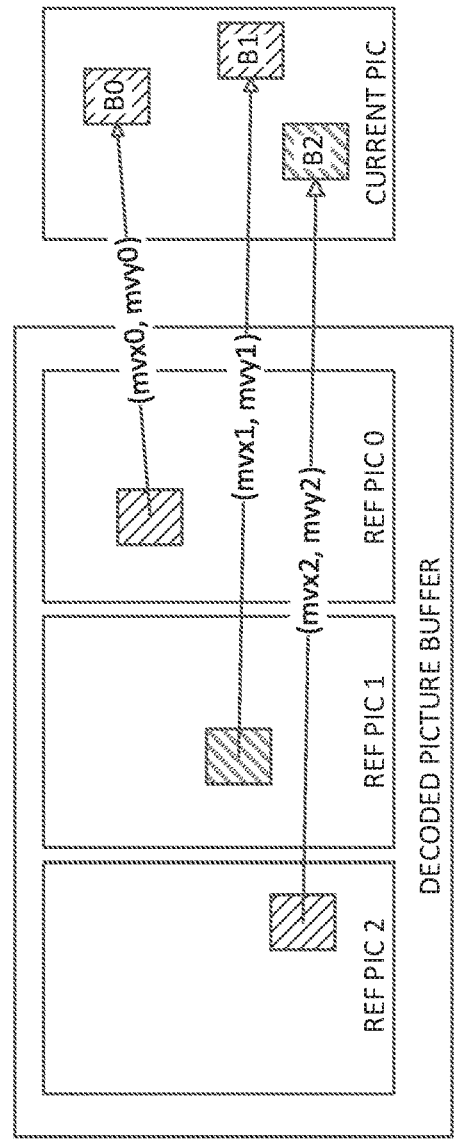

FIGS. 3A and 3B are diagrams illustrating an example of motion prediction of video blocks (e.g., using inter prediction modules 210 or 260). FIG. 3B, which illustrates an example of block-level movement within a picture, is a diagram illustrating an example decoded picture buffer including, for example, reference pictures "Ref pic 0," "Ref pic 1," and "Ref pic2." The blocks B0, B1, and B2 in a current picture may be predicted from blocks in reference pictures "Ref pic 0," "Ref pic 1," and "Ref pic2" respectively. Motion prediction may use video blocks from neighboring video frames to predict the current video block. Motion prediction may exploit temporal correlation and/or remove temporal redundancy inherent in the video signal. For example, in H.264/AVC and HEVC, temporal prediction may be performed on video blocks of various sizes (e.g., for the luma component, temporal prediction block sizes may vary from 16×16 to 4×4 in H.264/AVC, and from 64×64 to 4×4 in HEVC). With a motion vector of (mvx, mvy), temporal prediction may be performed as provided by the following equation:

$$P(x,y) = \text{ref}(x-mvx, y-mvy)$$

where ref(x,y) may be pixel value at location (x, y) in the reference picture, and P(x,y) may be the predicted block. A video coding system may support inter-prediction with fractional pixel precision. When a motion vector (mvx, mvy) has fractional pixel value, one or more interpolation filters may be applied to obtain the pixel values at fractional pixel positions. Block based video coding systems may use multi-hypothesis prediction to improve temporal prediction, for example, where a prediction signal may be formed by combining a number of prediction signals from different reference pictures. For example, H.264/AVC and/or HEVC may use bi-prediction that may combine two prediction signals. Bi-prediction may combine two prediction signals, each from a reference picture, to form a prediction, such as the following equation:

$$P(x, y) = \frac{P_0(x, y) + P_1(x, y)}{2} = \frac{\text{ref}_0(x - mvx_0, y - mvy_0) + \text{ref}_1(x - mvx_1, y - mvy_1)}{2}$$

where $P_0(x,y)$ and $P_1(x,y)$ may be the first and the second prediction block, respectively. The two prediction blocks may be obtained by performing motion-compensated prediction from two reference pictures $\text{ref}_0(x,y)$ and $\text{ref}_1(x,y)$, with two motion vectors $(mvx_0, mvy_0)$ and $(mvx_1, mvy_1)$ respectively. The prediction block P(x,y) may be subtracted from the source video block (e.g., at 216) to form a prediction residual block. The prediction residual block may be transformed (e.g., at transform unit 218) and/or quantized (e.g., at quantization unit 220). The quantized residual transform coefficient blocks may be sent to an entropy coding unit (e.g., entropy coding unit 232) to be entropy coded to reduce bit rate. The entropy coded residual coefficients may be packed to form part of an output video bitstream (e.g., bitstream 230). At the decoder side, the same motion-compensated prediction process may be performed (e.g. by inter prediction module 260), and the resulting prediction block may be added to the decoded residual block (e.g. at 266).

Affine Mode.

In HEVC, only a translational motion model is applied for motion compensated prediction. While in the real world, there are many kinds of motion, e.g. zoom in/out, rotation, perspective motions and other irregular motions. In VTM-2.0, an affine motion compensated prediction is applied. The affine motion model is either 4-parameter or 6-parameter. The first flag for each inter coded block is signaled to indicate whether the translation motion model or the affine motion model is applied for inter prediction. If it is an affine motion model, a second flag is sent to indicate whether the 4-parameter or 6-parameter model is used.

Figure 4B:
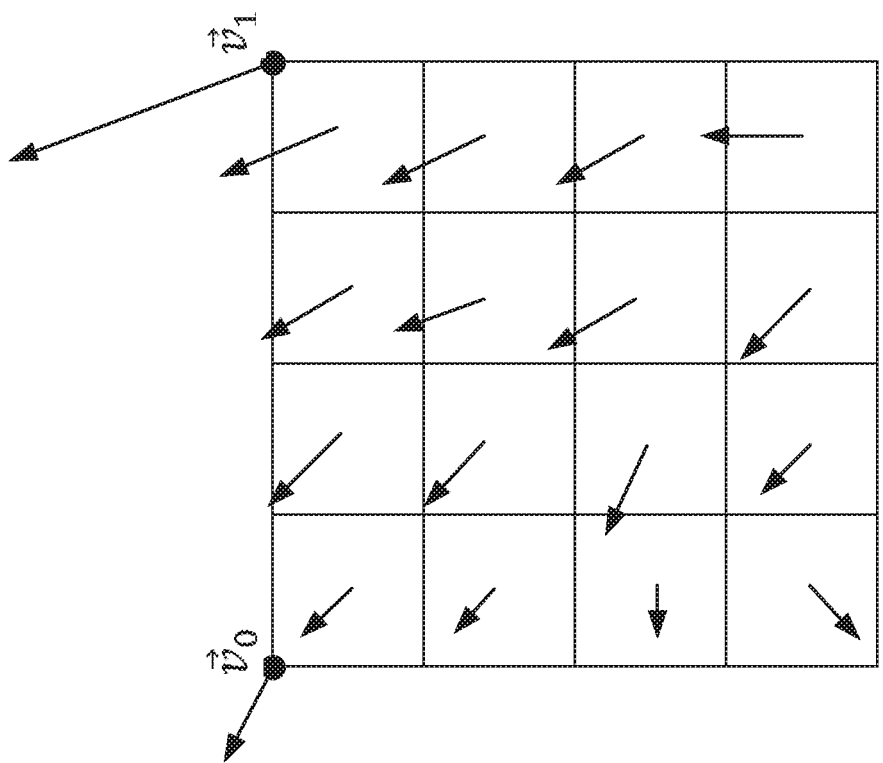
FIG. 4B illustrates sub-block-level motion derivation for affine blocks.
Figure 4A:
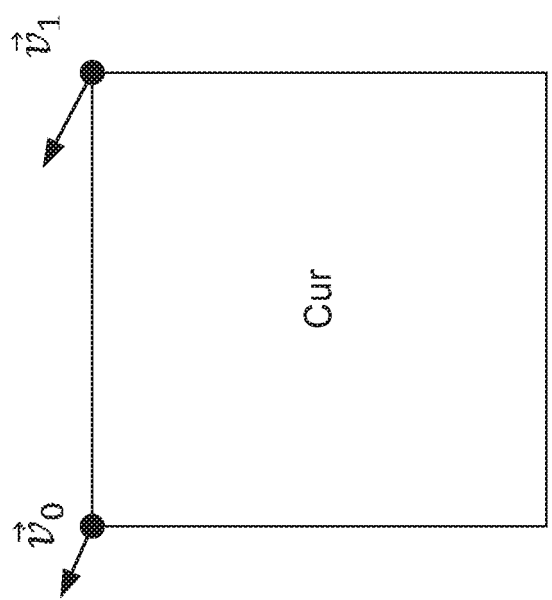
FIG. 4A illustrates a four-parameter affine motion model.

The affine motion model with four parameters may have the following parameters: two parameters for translation movement in horizontal and vertical directions, one parameter for zoom motion for both directions, and one parameter for rotation motion for both directions. A single zoom parameter is used because the horizontal zoom parameter is equal to the vertical zoom parameter. A single rotation parameter is used because the horizontal rotation parameter is equal to the vertical rotation parameter. The four-parameter affine motion model is coded in VTM using two motion vectors at two control point positions defined at top-left corner and top-right corner of the current block. As shown in FIG. 4A, the affine motion field of the block is described by two control point motion vectors ($V_0$, $V_1$). Based on the control point motion, the motion field ($v_x$, $v_y$) of an affine coded block is described as $$v_x = \frac{(v_{1x} - v_{0x})}{w} x - \frac{(v_{1y} - v_{0y})}{w} y + v_{0x} \qquad (1)$$

$$v_y = \frac{(v_{1y} - v_{0y})}{w} x + \frac{(v_{1x} - v_{0x})}{w} y + v_{0y}$$

In Eq. (1), ($v_{0x}$, $v_{0y}$) is the motion vector of the top-left corner control point and ($v_{1x}$, $v_{1y}$) is the motion vector of the top-right corner control point, as shown in FIG. 4A, and w is the width of the block. In VTM-2.0, the motion field of an affine coded block is derived at the 4×4 subblock level, such that ($v_x$, $v_y$) is derived for each of the 4×4 subblocks (FIG. 4B) within the current block and applied to the corresponding 4×4 subblock. (It should be noted that a set of samples that is referred to as a block in some contexts may be referred to as a subblock in other contexts. The different terms may be used in different contexts for the sake of clarity.)

Those four parameters of four-parameter affine model may be estimated iteratively. Denote the MV pairs at step k as $\{(v_{0x}^k, v_{0y}^k), (v_{1x}^k, v_{1y}^k)\}$, the original input luminance signal as I(i,j), and the prediction luminance signal as $I'_k(i,j)$. The spatial gradient $g_x(i,j)$ and $g_y(i,j)$ are derived with a Sobel filter applied on the prediction signal $I'_k(i,j)$ in the horizontal and vertical direction, respectively. The derivative of Eq. (1) can be represented as:

$$\begin{cases} dv_x^k(x, y) = c*x - d*y + a \\ dv_y^k(x, y) = d*x + c*y + b \end{cases} \qquad (2)$$

In Eq. (2), (a, b) are delta translational parameters and (c, d) are delta zoom and rotation parameters at step k. The delta MV at control points can be derived with its coordinates as shown in Eqs. (3) and (4). For example, (0, 0), (w, 0) are coordinates for top-left and top-right control points, respectively.

$$\begin{cases} dv_{0x}^k = v_{0x}^{k+1} - v_{0x}^k = a \\ dv_{0y}^k = v_{0y}^{k+1} - v_{0y}^k = b \end{cases} \qquad (3)$$

$$\begin{cases} dv_{1x}^k (v_{1x}^{k+1} - v_{1x}^k) = c*w + a \\ dv_{1y}^k (v_{1y}^{k+1} - v_{1y}^k) = d*w + b \end{cases} \qquad (4)$$

Based on the optical flow equation, the relationship between the change of luminance and the spatial gradient and temporal movement is formulated as:

$$I'_k(i,j) - I(i,j) = g_x(i,j) * dv_x^k(i,j) + g_y(i,j) * dv_y^k(i,j) \quad (5)$$

Substituting $dv_x^k(i,j)$ and $dv_y^k(i,j)$ with Eq. (2) gives an equation for parameters (a, b, c, d).

$$I'_k(i,j) - I(i,j) = (g_x(i,j)*i + g_y(i,j)*j)*c + (-g_x(i,j)*j + g_y(i,j)*i)*d + g_x(i,j)*a + g_y(i,j)*b \quad (6)$$

Since all samples in the block satisfy Eq. (6), the parameter set (a, b, c, d) can be solved using a least square error method. The MVs at two control points $\{(v_{0x}^{k+1}, v_{0y}^{k+1}), (v_{1x}^{k+1}, v_{1y}^{k+1})\}$ at step (k+1) can be solved with Eqs. (3) and (4), and they are rounded to a specific precision (e.g. ¼ pel). Using the iteration, the MVs at two control points can be refined until they converge when parameters (a, b, c, d) are all zeros or the iteration times meets a pre-defined limit.

Figure 5:
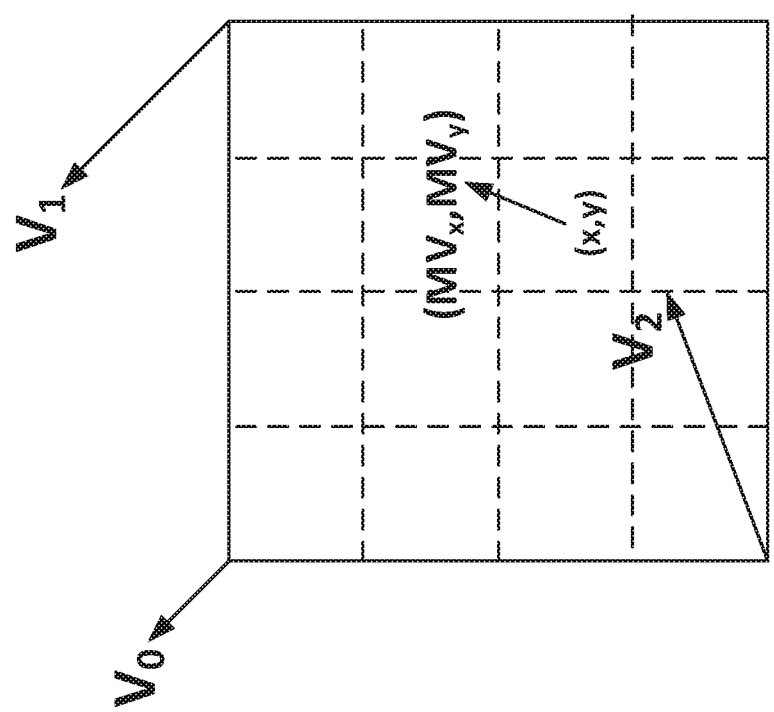
FIG. 5 illustrates a six-parameter affine mode: $V_0$, $V_1$, and $V_2$ are control point motion vectors; (MVx, MVy) is motion vector of the sub-block centered at position (x, y).

An example affine motion model with six parameters has the following parameters: two parameters for translation movement in horizontal and vertical directions, one parameter for zoom motion and one parameter for rotation motion in horizontal direction, and one parameter for zoom motion and one parameter for rotation motion in vertical direction. The six-parameter affine motion model is coded with three MVs at three control points. As shown in the example of FIG. 5, three control points for a six-parameter affine coded block are defined at the top-left, top-right and bottom left corner of the block. The motion at the top-left control point is related to translational motion, the motion at the top-right control point is related to rotation and zoom motion in horizontal direction, and the motion at the bottom-left control point is related to rotation and zoom motion in vertical direction. For a 6-parameter affine motion model, the rotation and zoom motion in horizontal direction may not be same as those motion in vertical direction. The motion vector of each sub-block $(v_x, v_y)$ may be derived using three MVs at control points as:

$$v_x = v_{0x} + (v_{1x} - v_{0x}) * \frac{x}{w} + (v_{2x} - v_{0x}) * \frac{y}{h} \quad (7)$$
$$v_y = v_{0y} + (v_{1y} - v_{0y}) * \frac{x}{w} + (v_{2y} - v_{0y}) * \frac{y}{h}$$

In Eq. (7), $(v_{2x}, v_{2y})$ is motion vector of the bottom-left control point, (x,y) is the center position of a sub-block, and w and h are the width and height of the block.

The six parameters of a six-parameter affine model may be estimated in a manner similar to that used in the four-parameter model. Eq. (2) may be revised into Eq. (8) as follows.

$$\begin{cases} dv_x^k(x,y) = c*x + d*y + a \\ dv_y^k(x,y) = e*x + f*y + b \end{cases} \quad (8)$$

In Eq. (8), (a, b) are delta translation parameters, (c, d) are delta zoom and rotation parameters for the horizontal direction, and (e, f) are delta zoom and rotation parameters for the vertical direction, at step k. Eq. (6) is changed accordingly to give Eq. (9).

$$I'_k(i,j) - I(i,j) = (g_x(i,j)*i)*c + (g_x(i,j)*j)*d + \quad (9)$$
$$(g_y(i,j)*i)*e + (g_y(i,j)*j)*f + g_x(i,j)*a + g_y(i,j)*b$$

The parameter set (a, b, c, d, e, f) can be solved using a least square method by considering all samples within the block. The MV of the top-left control point $(v_{0x}^{k+1}, v_{1y}^{k+1})$ is calculated with Eq. (3). The MV of the top-right control point $(v_{1x}^{k+1}, v_{1y}^{k+1})$ is calculated with Eq. (10). The MV of the top-right control point $(v_{2x}^{k+1}, v_{2y}^{k+1})$ is calculated with Eq. (11).

$$\begin{cases} dv_{1x}^k = (v_{1x}^{k+1} - v_{1x}^k) = c*w + a \\ dv_{1y}^k = (v_{1y}^{k+1} - v_{1y}^k) = e*w + b \end{cases} \quad (10)$$

$$\begin{cases} dv_{2x}^k = (v_{2x}^{k+1} - v_{2x}^k) = d*h + a \\ dv_{2y}^k = (v_{2y}^{k+1} - v_{2y}^k) = f*h + b \end{cases} \quad (11)$$

Prediction Refinement with Optical Flow (PROF) for Affine Mode.

To achieve a finer granularity of motion compensation, a method has been proposed for refining the sub-block based affine motion compensated prediction with optical flow, as described in Jiancong (Daniel) Luo, Yuwen He, "CE2-related: Prediction refinement with optical flow for affine mode", JVET-N0236, March 2019, Geneva, Switzerland. After the sub-block based affine motion compensation is performed, each luma prediction sample is refined by adding a difference derived by the optical flow equation. The proposed PROF is described as including the following steps.

In a first step, the sub-block-based affine motion compensation is performed to generate sub-block prediction I(i,j).

In a second step, the spatial gradients $g_x(i,j)$ and $g_y(i,j)$ of the sub-block prediction are calculated at each sample location using a 3-tap filter [−1, 0, 1].

$$g_x(i,j) = I(i+1,j) - I(i-1,j)$$
$$g_y(i,j) = I(i,j+1) - I(i,j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Figure 6:
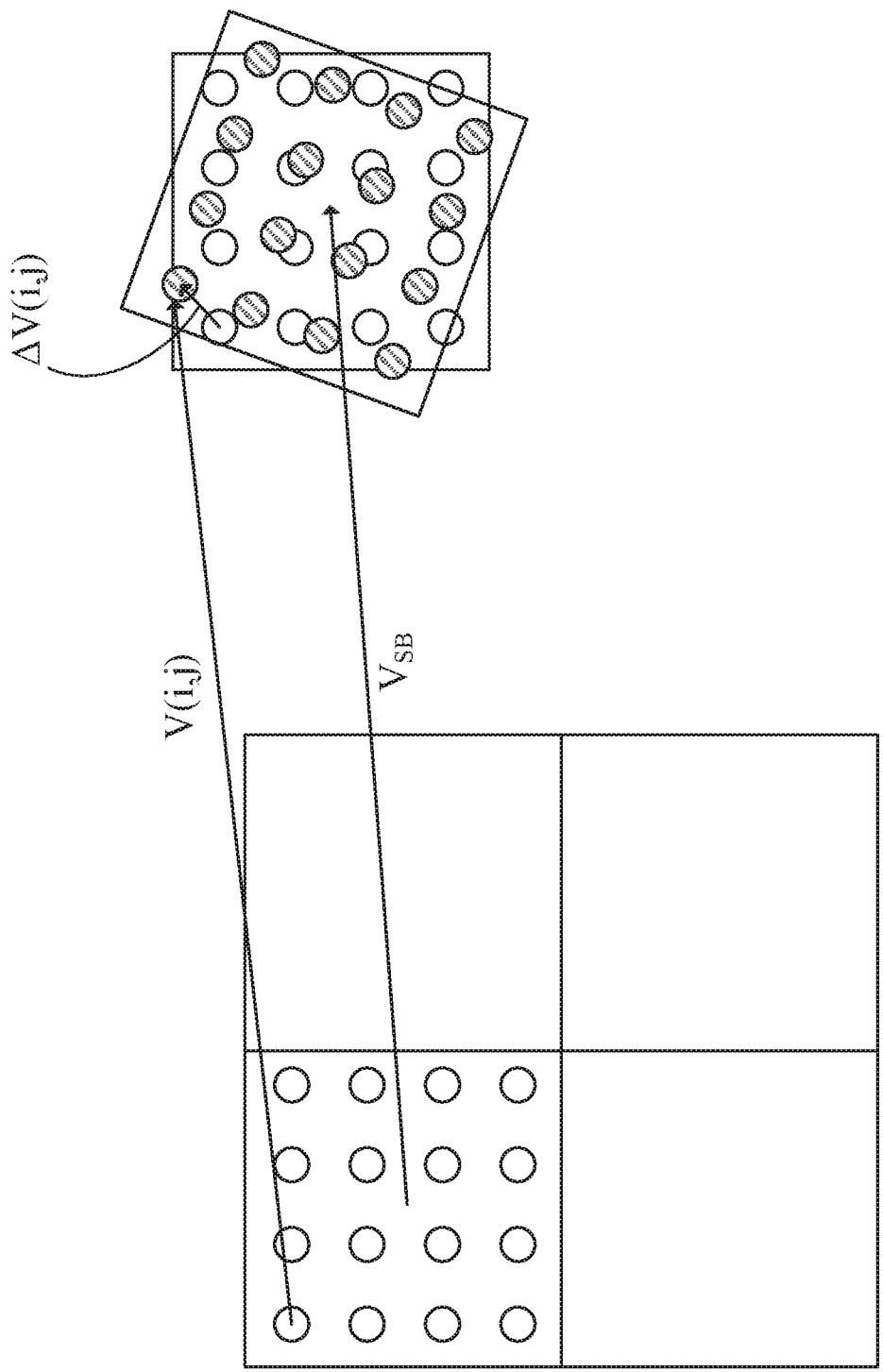
FIG. 6 illustrates sub-block motion vector $V_{SB}$ and pixel refinement $\Delta v(i,j)$.

In a third step, the luma prediction refinement is calculated by the optical flow equation.

$$\Delta I(i,j) = g_x(i,j) * \Delta v_x(i,j) + g_y(i,j) * \Delta v_y(i,j) \quad (12)$$

where the $\Delta v(i,j)$ is the difference between pixel MV computed for sample location (i,j), denoted by v(i,j), and the sub-block MV of the sub-block to which pixel (i,j) belongs, as shown in FIG. 6. Since the affine model parameters and the pixel location relative to the sub-block center are not changed from sub-block to sub-block, $\Delta v(i,j)$ can be calculated for the first sub-block, and reused for other sub-blocks in the same block. Let x and y be the horizontal and vertical offset from the pixel location to the center of the sub-block, $\Delta v(x,y)$ may be derived by the following equation, $$\begin{cases} \Delta v_x(x,y) = c*x + d*y \\ \Delta v_y(x,y) = e*x + f*y \end{cases}$$

For a four-parameter affine model, $$\begin{cases} c = f = \dfrac{v_{1x} - v_{0x}}{w} \\ e = -d = \dfrac{v_{1y} - v_{0y}}{w} \end{cases}$$

For a six-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0x}}{h} \end{cases}$$

where $(v_{0x}, v_{0y})$, $(v_{1x}, v_{1y})$, $(v_{ex}, v_{2y})$ are the top-left, top-right and bottom-left control point motion vectors, w and h are the width and height of the block.

In a fourth step, the luma prediction refinement is added to the sub-block prediction I(i,j). The final prediction I' may be generated using the following equation.

$$I'(i,j) = I(i,j) + \Delta I(i,j) \tag{13}$$

Issues Addressed in Some Embodiments.

The current motion compensation process is typically limited by the precision of the motion vector. For example, the indicated motion vectors at the decoder side are used in motion compensated prediction at the sample level or sub-block level or block level, which will determine the integer reference sample position and interpolation filter at a fractional position if it has factional part. The precision of the associated motion vectors is a factor in the precision of motion compensated prediction at each sample. If four extra bits are used for the fractional parts of the motion vectors, 1/16 PEL precision may be achieved. However, this precision limit leads to potential issues. One issue is that if the motion compensated prediction is already accurate enough, the extra bits are a waste of signaling overhead. Another issue is that in some cases, the number of extra bits provided may be still not enough, and even higher precision may be desirable. To provide more efficient precision representation, a more flexible and accurate method may be beneficial in improving motion compensated precision.

In VTM-5.0, if a specific granularity of precision is desired, corresponding interpolation filter(s) at that precision or higher precision are defined in advance, which prevents the use of arbitrary precision. For example, for a decoder to achieve a precision of 1/32 PEL, which is finer than 1/16 PEL precision in VTM-5.0, the interpolation filter at 1/32 PEL precision or a higher precision (e.g. 1/64 PEL) would be a predetermined interpolation filter (e.g. a filter defined in a video standards specification).

Overview of Example Embodiments

This disclosure describes systems and methods to refine prediction precision for a motion compensation (MC) prediction process with optical flow in a flexible way for use with precision refinement. In some embodiments, after motion compensation is performed, a prediction at each sample is refined by adding a difference value derived by the optical flow equation. Such a refinement may be referred to as motion compensation precision refinement with optical flow (MCPROF). The optical flow may be signaled as a motion vector refinement at the block level (which may be a prediction unit level, such as a CU level or a sub-CU level). The difference value derived by the optical flow equation may represent different precisions, so that a finer precision may be achieved. Some embodiments described herein can achieve pixel-level granularity without significantly increasing the complexity and can keep the worst-case memory access bandwidth the same as regular block level motion compensation. Various embodiments described herein may be applied to any sub-block based inter prediction mode and/or block-based inter prediction mode. Embodiments described herein can be applied to both uni-prediction and bi-prediction, and they can be applied to both inter merge mode and non-merge mode. One potential benefit of some embodiments is to provide precision refinement without calling for any additional interpolation filters.

Motion Compensation Precision Refinement with Optical Flow (MCPROF).

To achieve a finer precision of motion compensation, methods are employed in some embodiments to refine the motion compensated prediction using optical flow. After the motion compensation process is performed, luma or/and chroma prediction at each sample is refined by adding a difference derived by the optical flow equation. An example encoding method using MCPROF proceeds as follows.

In an example method, a motion compensation process is used to generate prediction I(i,j) at each sample location (i,j) after motion estimation for inter non-merge mode. The motion compensation process may be performed using an existing inter prediction process (including uni-prediction, bi-prediction and affine prediction). There may be one or more motion compensation processes (e.g., multiple motion vector candidates are available) performed at this step. In the case of multiple motion compensation processes, one of the multiple motion compensation processes may be selected according to predefined criteria (e.g., the motion compensation process with minimum rate-distortion cost), as is done in VTM 5.0.

The one or selected motion compensation processes is/are evaluated to determine whether to use a precision refinement. For example, if the existing precision (e.g., 1/4 PEL) provided after the MC process is accurate enough, a determination may be made to not proceed with precision refinement. Such a determination may be made if, for example, the residual value is close to 0 (e.g. below a predetermined magnitude threshold) with the current motion compensation precision.

In some circumstances, however, a determination is made to proceed with precision refinement. In this case, a determination may be made of a precision difference N used to convey the extent of the refinement. For example, a determination may be made through the motion compensation process that a substantially optimal (or accurate) residual value would be about 9/16 PEL. To accommodate the optimal accuracy, a motion compensation precision of 1/16 PEL may be desirable. However, if the current motion compensation process uses a precision of 1/4 PEL (e.g., provided by the existing defined interpolation filters), then the precision difference N between the current precision and the desired precision is two.

In some embodiments, a motion compensated prediction refinement is determined using optical flow as follows. Denote the motion compensated prediction with the existing motion vector or vectors as MCP(i, j), the uncompressed original input sample value as O(i, j), the horizontal spatial gradient of MCP(i, j) as $g_x(i,j)$, and the vertical spatial gradient of MCP(i, j) as $g_y(i,j)$. The additional motion vector refinement ($\Delta mv_x, \Delta mv_y$) is used in the optical flow. The motion vector refinement ($\Delta mv_x, \Delta mv_y$) may be selected so as to substantially satisfy Eq. 14.

$$O(i,j)=MCP(i,j)+g_x(i,j)*\Delta mv_x+g_y(i,j)*\Delta mv_y \quad (14)$$

In some embodiments, the motion vector refinement ($\Delta mv_x, \Delta mv_y$) is estimated with a least square method as in Eq. (15).

$$(\Delta mv_x, \Delta mv_y) = \text{argMin}\left(\sum_{(i,j)}|O(i,j)-MCP(i,j)-g_x(i,j)*\Delta mv_x-g_y(i,j)*\Delta mv_y|^2\right) \quad (15)$$

If a determination is made to use a finer precision (e.g., in terms of bit depth), the motion vector refinement values $\Delta mv(i,j)$ (i.e. ($\Delta mv_x(i,j), \Delta mv_y(i,j)$)) may be signaled in the bitstream. In some embodiments, an associated precision difference N may also be signaled in the bitstream. In order to save signaling overhead, N may be signaled at different levels such as at the slice/picture level, the CTU level, or the CU (or other block) level. Similarly, the motion vector refinement values may be also signaled at different levels such as at the slice/picture level, the CTU level, the CU (or other block) level, or sample level. If motion vector refinement values are not signaled at sample level, the motion vector refinement values within a block or sub-block may be the same for each sample within that block or sub-block.

Figure 7:
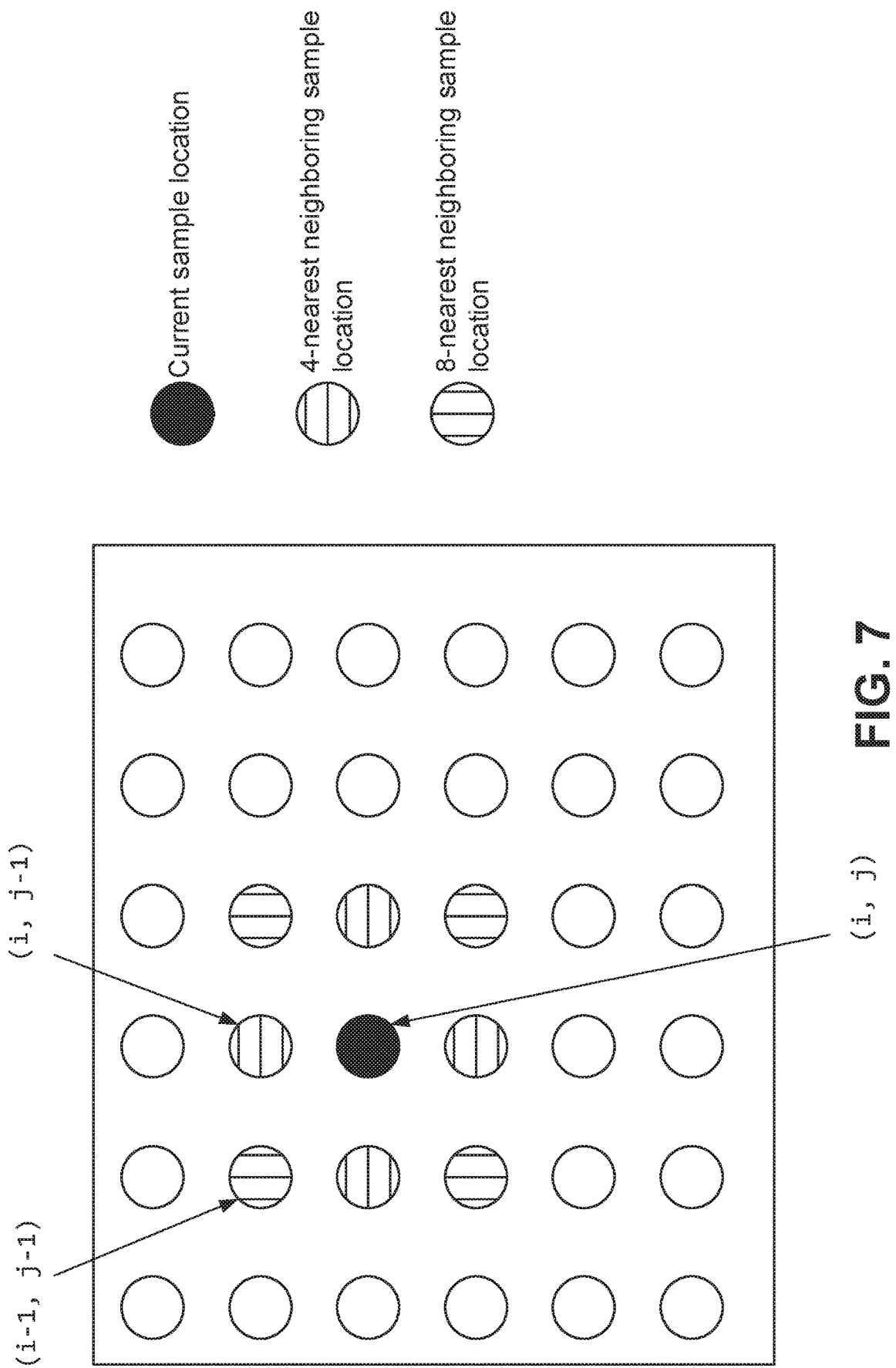
FIG. 7 illustrates use of neighboring locations to signal additional motion vectors.

In some embodiments, the additional motion vector refinement value may be signaled in the format of a specific neighboring sample location. As shown in FIG. 7, a neighboring location may be used to indicate a motion vector refinement value, which may be represented by one of the 4-nearest neighboring locations or 8-nearest neighboring locations (e.g., 1 pixel distance) or even further neighboring locations (e.g., more than 1 pixel distance). In the example shown in FIG. 7, if neighboring sample location (i,j−1) is signaled, it has the effect of signaling a motion vector refinement value $\Delta mv(i,j)=(0, -1)$, where $\Delta mv_x(i,j)=0$, $\Delta mv_y(i,j)=-1$. Alternatively, if neighboring sample location (i−1, j−1) is signaled, it has the effect signaling a motion vector refinement value $\Delta mv(i,j)=(-1, -1)$, where $\Delta mv_x(i,j)=-1$, $\Delta mv_y(i,j)=-1$.

In some embodiments, the motion vector refinement value may be signaled in the format of an index value. For example, if 4-nearest neighboring locations is used, the corresponding above, below, left and right neighboring locations may be indexed as 0, 1, 2, 3, as one example. The index may be binarized with a variable length codewords. For example, if 8-nearest neighboring locations are allowed, the index for the 4-nearest neighboring locations may be coded using a codeword with a shorter length than that for the other 4 remaining neighboring locations in two diagonal directions.

In some embodiments, the associated precision difference N may be an integer value which is equal to the bit depth difference between current precision and desired precision. For example, if the current precision of a motion compensated prediction process is ¼ PEL and the desired precision is 1/16 PEL, the signaled precision may be N=2. In some embodiments, the encoder signals a flag indicating whether or not MCPROF is used.

Prediction Using Precision Refinement with Optical Flow.

The precision difference N and the motion vector refinement value may be used by an encoder (e.g. at module 210) or a decoder (e.g. at module 260) in the generation of a prediction of a block or sub-block. In cases where MCPROF is used (e.g. where an enabling flag is signaled in the bitstream), the values of the signaled $\Delta mv(i,j)$ and N are obtained. The spatial gradients $g_x(i,j)$ and $g_y(i,j)$ are calculated for each sample location (i,j). The determination of spatial gradients may be performed using a three-tap filter as described above or using other techniques.

An initial motion-compensated prediction I(i,j) is generated for the current block e.g. using uni-prediction, bi-prediction and/or affine prediction. A precision refinement is calculated using a scalar product of the motion vector refinement and the spatial gradient, according to Eq. 16.

$$\Delta I(i,j)=(g_x(i,j)*\Delta mv_x(i,j)+g_y(i,j)*\Delta mv_y(i,j))>>(N+\text{existing } MC \text{ precision}) \quad (16)$$

where $\Delta mv(i,j)$ is the signaled motion vector refinement value (e.g. received from the encoder), N is the signaled bit depth difference between the current precision and desired precision, and g(i,j) is the spatial gradient calculated as described above.

The motion compensated prediction at each sample is refined by adding the intensity change (e.g., luminance or chrominance). The final prediction I' may be generated according to the following equation.

$$I'(i,j)=I(i,j)+\Delta I(i,j) \quad (17)$$

In the above example embodiment, 4-neighboring or 8-neighboring locations are considered. Each selected neighboring location is used to indicate the direction of the precision refinement, and there is no dependency on waiting for the motion compensation process of its neighboring samples to be completed.

Figure 8:
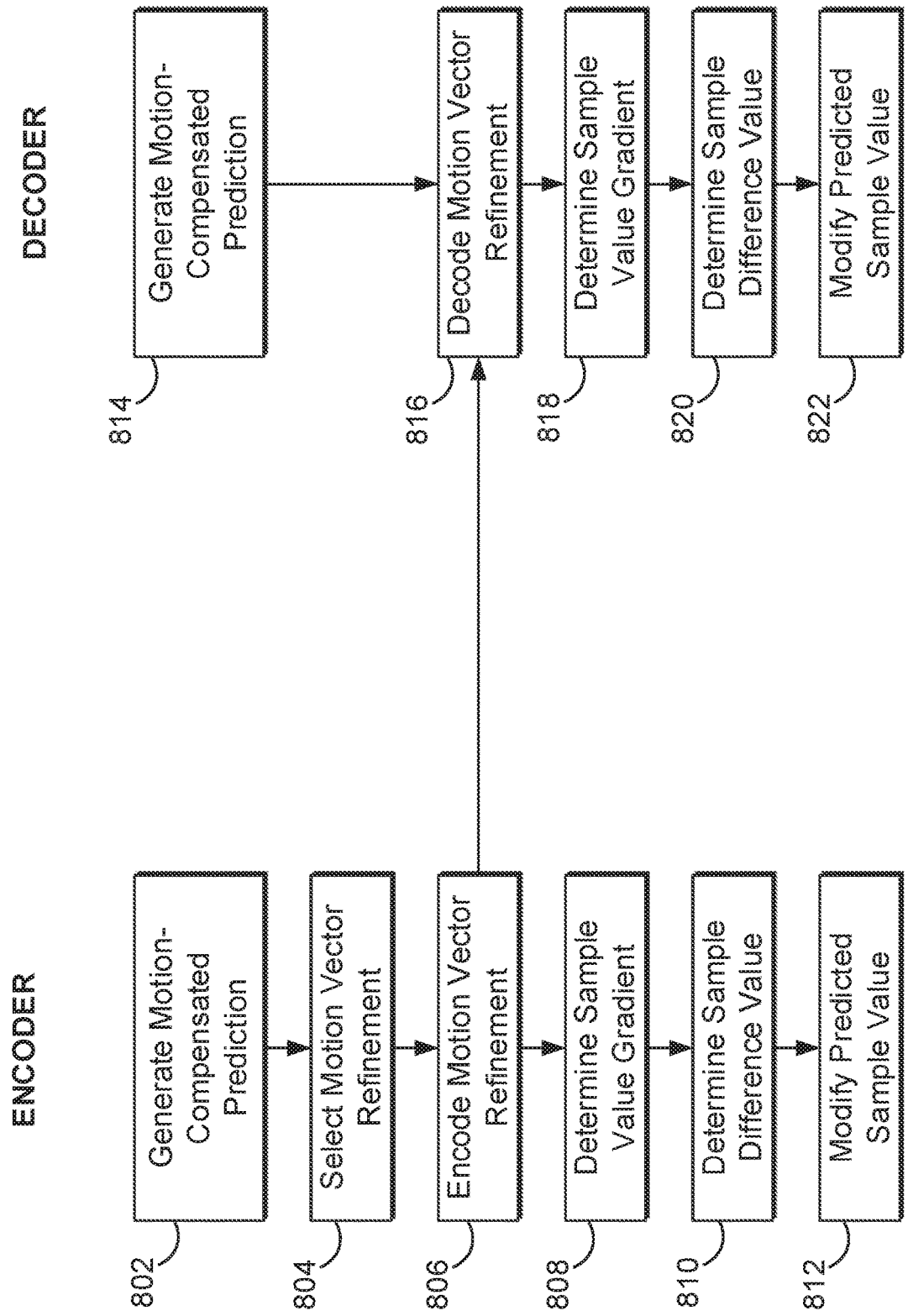
FIG. 8 is a flow chart illustrating encoding and decoding methods performed in some embodiments, including coding functions that may be performed at both the encoder and decoder.

Example methods are illustrated in FIG. 8. At a video encoder, an initial predicted sample value is obtained (802), based on motion-compensated prediction, for at least a first sample position in a current block of samples. A motion vector refinement is determined (804) for at least the first sample position. The motion vector refinement may be encoded (806) in a bitstream, e.g. for storage or transmission.

A spatial gradient of sample values is determined (808) at the first sample position. A sample difference value is determined (810) based on a scalar product of the spatial gradient and the motion vector refinement. In some embodiments, the determination of the sample difference value may include scaling (e.g. bit-shifting) the sample difference value, and precision information indicating the amount of scaling may be encoded in the bitstream. The initial predicted sample value is modified (812) based on the sample difference value, for example by adding the sample difference value to the initial predicted sample value to generate a refined sample value.

In some embodiments, the determination (804) of the motion vector refinement may include selecting the motion vector refinement to substantially minimize a prediction error with respect to an input video block. In embodiments where the motion vector refinement is selected on a sample-by-sample basis, the prediction error may be based on a difference (e.g. an absolute or square difference) between the refined sample value and the corresponding sample value of the input video block. In embodiments where the motion vector refinement is selected on a block-by-block (or sub-block-by-subblock) basis, the prediction error may be based on a sum of differences (e.g. a sum of absolute or square differences) between refined sample values and the corresponding input video block sample values over a plurality of sample positions in the block (or subblock).

In some embodiments, the encoder may use refined sample values as generated at 812 in determining a prediction residual, and that prediction residual may also be encoded in the bitstream.

In a method performed by a video decoder, the decoder, based on motion-compensated prediction, obtains an initial predicted sample value (814) for at least a first sample position in a current block of samples. A motion vector refinement is determined (816) for at least the first sample position, e.g. by decoding the motion vector refinement from the bitstream. A spatial gradient of sample values is determined (818) at the first sample position. A sample difference value is determined (820) by calculating a scalar product of the spatial gradient and the motion vector refinement. In some embodiments, the determination of the sample difference value may further include scaling the sample difference value based on precision information decoded from the bitstream. The initial predicted sample value is modified (822) based on the sample difference value. For example, the sample difference value may be added to the initial predicted sample value to generate a refined sample value.

In some embodiments, the decoder may further decode a prediction residual from the bitstream, and the prediction residual may be used in determining a reconstructed sample value at the first sample position. The reconstructed sample values may be displayed or communicated to a separate display device for display.

Example Communications System.

Figure 9:
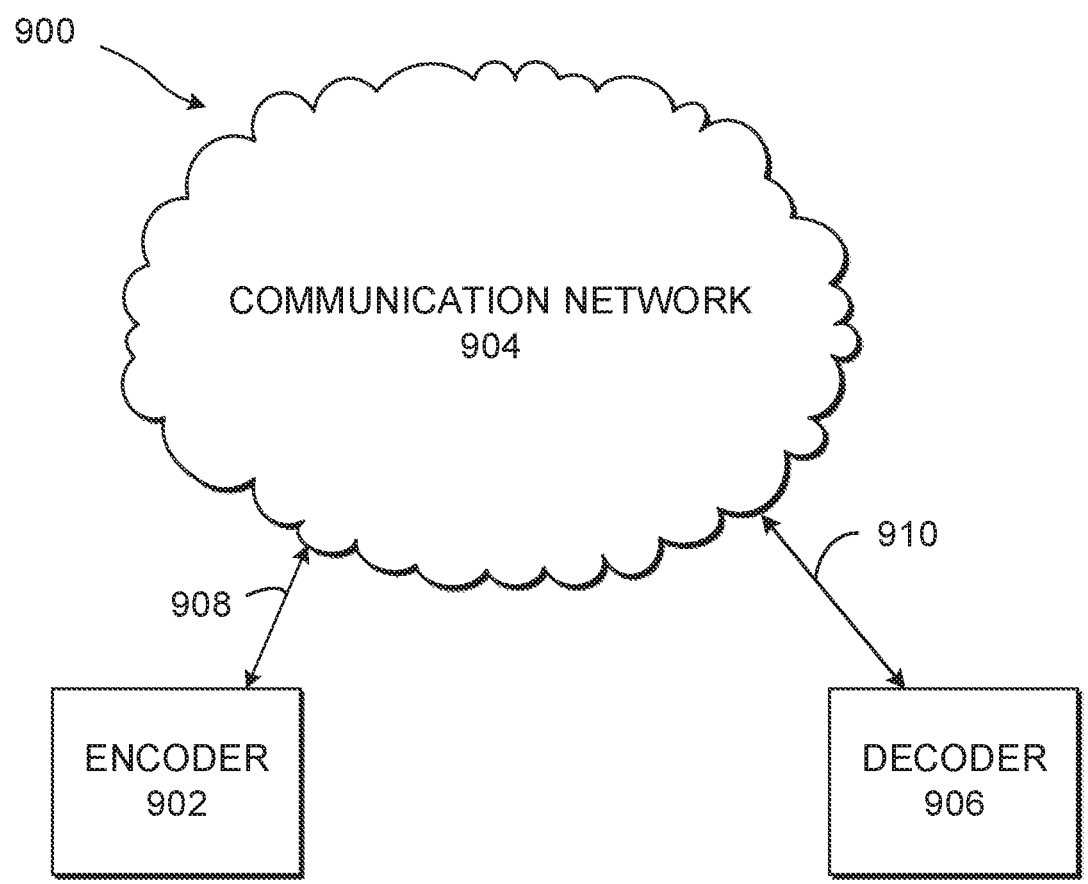
FIG. 9 is a diagram illustrating an example communication system.

FIG. 9 is a diagram illustrating an example of a communication system. The communication system 900 may comprise an encoder 902, a communication network 904, and a decoder 906. The encoder 902 may be in communication with the network 904 via a connection 908, which may be a wireline connection or a wireless connection. The encoder 902 may be similar to the block-based video encoder of FIG. 2A. The encoder 902 may include a single layer codec or a multilayer codec. The decoder 906 may be in communication with the network 904 via a connection 910, which may be a wireline connection or a wireless connection. The decoder 906 may be similar to the block-based video decoder of FIG. 2B. The decoder 906 may include a single layer codec or a multilayer codec.

The encoder 902 and/or the decoder 906 may be incorporated into a wide variety of wired communication devices and/or wireless transmit/receive units (WTRUs), such as, but not limited to, digital televisions, wireless broadcast systems, a network element/terminal, servers, such as content or web servers (such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 904 may be a suitable type of communication network. For example, the communications network 904 may be a multiple access system that provides content, such as voice, data, video, messaging, broadcast, etc., to multiple wireless users. The communications network 904 may enable multiple wireless users to access such content through the sharing of system resources, including wireless bandwidth. For example, the communications network 904 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 904 may include multiple connected communication networks. The communication network 904 may include the Internet and/or one or more private commercial networks such as cellular networks, WiFi hotspots, Internet Service Provider (ISP) networks, and/or the like.

Additional Embodiments

A block-based video coding method according to some embodiments comprises, at a decoder: generating a motion-compensated prediction of sample values in a current block of samples; decoding, from a bitstream, a precision difference value and a motion vector refinement for the current block; and for each predicted sample in the current block: determining a spatial gradient at the sample; calculating a scalar product of the spatial gradient and the motion vector refinement; scaling the scalar product by an amount indicated by the precision difference value to generate a sample difference value; and adding the sample difference value to the predicted sample value to generate a refined sample value.

In some embodiments, the motion-compensated prediction of sample values in the current block is generated with uni-prediction.

In some embodiments, the motion-compensated prediction of sample values in the current block is generated with bi-prediction.

In some embodiments, the motion vector refinement is signaled in the bitstream as an index. The index may identify one of a plurality of motion vector refinements of the form (i,j), where i and j are integers. The index may identify one of a plurality of motion vector refinements from the group consisting of (0,1), (1,0), (0,1), and (−1,0). The index may identify one of a plurality of motion vector refinements from the group consisting of (0,1), (1,0), (0,1), (−1,0), (−1,1), (1,1), (1,1), and (−1,1).

In some embodiments, the scaling of the scalar product comprises bit-shifting the scalar product.

In some embodiments, the precision difference value is N, and scaling the scalar product comprises right-shifting the scalar product by a number of bits equal to the sum of the signaled precision difference value N and an existing MC precision.

A block-based video coding method according to some embodiments comprises, at an encoder: generating, for an input video block, a motion-compensated prediction of sample values in a current block of samples; selecting a precision difference value; determining respective spatial gradients at the samples; determining a motion vector refinement for the current block, wherein the motion vector refinement is selected to substantially minimize an error between (i) a scalar product of the spatial gradients and the motion vector refinement and (ii) a difference between the input video block and the motion compensated prediction; and signaling, in a bitstream, a precision difference value and the motion vector refinement for the current block.

In some embodiments, the motion-compensated prediction of sample values in the current block is generated with uni-prediction.

In some embodiments, the motion-compensated prediction of sample values in the current block is generated with bi-prediction.

In some embodiments, the motion vector refinement is signaled in the bitstream as an index. The index may identify one of a plurality of motion vector refinements of the form (i,j), where i and j are integers. The index may identify one of a plurality of motion vector refinements from the group consisting of (0,1), (1,0), (0,1), and (−1,0). The index may identify one of a plurality of motion vector refinements from the group consisting of (0,1), (1,0), (0,1), (−1,0), (−1,1), (1,1), (1,1), and (−1,1).

In some embodiments, the motion vector refinement is selected to substantially minimize a sum of square differences between (i) a scalar product of the spatial gradients and the motion vector refinement and (ii) a difference between the input video block and the motion compensated prediction.

Some embodiments include a processor and a non-transitory computer-readable medium operative to perform any of the functions described herein.

This disclosure describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the disclosure or scope of those aspects. Indeed, all of the different aspects can be combined and interchanged to provide further aspects. Moreover, the aspects can be combined and interchanged with aspects described in earlier filings as well.

The aspects described and contemplated in this disclosure can be implemented in many different forms. While some embodiments are illustrated specifically, other embodiments are contemplated, and the discussion of particular embodiments does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present disclosure, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various numeric values may be used in the present disclosure, for example. The specific values are for example purposes and the aspects described are not limited to these specific values.

Embodiments described herein may be carried out by computer software implemented by a processor or other hardware, or by a combination of hardware and software. As a non-limiting example, the embodiments can be implemented by one or more integrated circuits. The processor can be of any type appropriate to the technical environment and can encompass one or more of microprocessors, general purpose computers, special purpose computers, and processors based on a multi-core architecture, as non-limiting examples.

Various implementations involve decoding. "Decoding", as used in this disclosure, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this disclosure, for example, extracting a picture from a tiled (packed) picture, determining an upsampling filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions.

Various implementations involve encoding. In an analogous way to the above discussion about "decoding", "encoding" as used in this disclosure can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this disclosure.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

Additionally, this disclosure may refer to "determining" various pieces of information. Determining the information can include one or more of, for example, estimating the information, calculating the information, predicting the information, or retrieving the information from memory.

Further, this disclosure may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this disclosure may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items as are listed.

Also, as used herein, the word "signal" refers to, among other things, indicating something to a corresponding decoder. For example, in certain embodiments the encoder signals a particular one of a plurality of parameters for region-based filter parameter selection for de-artifact filtering. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

Implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs an encoding or decoding method according to any of the embodiments described.

A TV, set-top box, cell phone, tablet, or other electronic device that performs a decoding method according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs decoding according to any of the embodiments described.

A TV, set-top box, cell phone, tablet, or other electronic device that receives (e.g. using an antenna) a signal over the air that includes an encoded image, and performs decoding according to any of the embodiments described.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video coding method comprising:
   obtaining an initial predicted sample value, based on motion-compensated prediction, for at least a first sample position in a current block of samples;
   determining a motion vector refinement associated with at least the first sample position, wherein the motion vector refinement is signaled at the block level, and the motion vector refinement is the same for all sample positions in the current block;
   determining, at the first sample position, a spatial gradient of sample values;
   determining a sample difference value based on a scalar product of the spatial gradient and the motion vector refinement; and
   modifying the initial predicted sample value based on the sample difference value.

2. The method of claim 1, performed by a decoder, wherein the motion vector refinement is signaled in a bitstream as an index, and determining the motion vector refinement comprises decoding the index from the bitstream.

3. The method of claim 2, further comprising decoding refinement precision information from the bitstream, wherein determining the sample difference value comprises scaling the scalar product by an amount indicated by the precision information.

4. The method of claim 3, wherein scaling the scalar product comprises bit-shifting the scalar product by an amount indicated by the precision information.

5. The method of claim 3, wherein the motion-compensated prediction is performed using at least one motion vector having an initial precision, and wherein the refinement precision information comprises a precision difference value representing a difference between the initial precision and the refinement precision.

6. The method of claim 3, wherein scaling the scalar product comprises right-shifting the scalar product by a number of bits equal to the sum of the precision difference value and the initial precision.

7. The method of claim 1, performed by an encoder, wherein determining a motion vector refinement comprises selecting the motion vector refinement to substantially minimize a prediction error with respect to an input video block, and wherein the method further comprises encoding the motion vector refinement in the bitstream.

8. The method of claim 2, wherein the index identifies one of a plurality of motion vector refinements from the group consisting of (0,−1), (1,0), (0,1), and (−1,0).

9. The method of claim 2, wherein the index identifies one of a plurality of motion vector refinements from the group consisting of (0,−1), (1,0), (0,1), (−1,0), (−1,−1), (1,−1), (1,1), and (−1,1).

10. The method of claim 2 wherein the index is signaled at the block level.

11. An apparatus comprising a processor configured to perform at least:
    obtaining an initial predicted sample value, based on motion-compensated prediction, for at least a first sample position in a current block of samples;
    determining a motion vector refinement associated with at least the first sample position, wherein the motion vector refinement is signaled at the block level, and the motion vector refinement is the same for all sample positions in the current block;
    determining, at the first sample position, a spatial gradient of sample values;
    determining a sample difference value based on a scalar product of the spatial gradient and the motion vector refinement; and
    modifying the initial predicted sample value based on the sample difference value.

12. The apparatus of claim 11, wherein the apparatus comprises a decoder, and wherein the motion vector refinement is encoded in a bitstream as an index, and determining a motion vector refinement comprises decoding the index from the bitstream.

13. The apparatus of claim 12, wherein the processor is further configured to decode refinement precision information from the bitstream, and wherein determining the sample difference value comprises scaling the scalar product by an amount indicated by the precision information.

14. The apparatus of claim 11, wherein the apparatus comprises an encoder, and wherein determining a motion vector refinement comprises selecting the motion vector refinement to substantially minimize an error between the refined sample value and a corresponding sample value of an input video block, and wherein the method further comprises encoding the motion vector refinement in the bitstream.

15. A non-transitory computer-readable medium storing instructions for causing one or more processors to perform:
obtaining an initial predicted sample value, based on motion-compensated prediction, for at least a first sample position in a current block of samples;
determining a motion vector refinement associated with at least the first sample position, wherein the motion vector refinement is signaled at the block level, and the motion vector refinement is the same for all sample positions in the current block;
determining, at the first sample position, a spatial gradient of sample values;
determining a sample difference value based on a scalar product of the spatial gradient and the motion vector refinement; and
modifying the initial predicted sample value based on the sample difference value.

16. The non-transitory computer-readable medium of claim 15 wherein the motion vector refinement is signaled in a bitstream as an index.

17. The non-transitory computer-readable medium of claim 15, wherein refinement precision information is coded in the bitstream, and wherein determining the sample difference value comprises scaling the scalar product by an amount indicated by the precision information.

* * * * *